United States Patent
Shao

(10) Patent No.: US 11,272,520 B2
(45) Date of Patent: Mar. 8, 2022

(54) UPLINK TRANSMISSION METHOD, TERMINAL DEVICE, AND NETWORK DEVICE

(71) Applicant: Huawei Technologies Co., Ltd., Shenzhen (CN)

(72) Inventor: Jiafeng Shao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 88 days.

(21) Appl. No.: 16/785,136

(22) Filed: Feb. 7, 2020

(65) Prior Publication Data

US 2020/0178263 A1 Jun. 4, 2020

Related U.S. Application Data

(63) Continuation of application No. PCT/CN2018/098635, filed on Aug. 3, 2018.

(30) Foreign Application Priority Data

Aug. 10, 2017 (CN) .......................... 201710682571.1

(51) Int. Cl.
*H04W 72/10* (2009.01)
*H04L 5/00* (2006.01)
(Continued)

(52) U.S. Cl.
CPC ............ *H04W 72/10* (2013.01); *H04L 5/0055* (2013.01); *H04W 72/0473* (2013.01); *H04W 74/0833* (2013.01)

(58) Field of Classification Search
None
See application file for complete search history.

(56) References Cited

U.S. PATENT DOCUMENTS 9,532,321 B2 12/2016 Xu et al.
9,763,199 B2 9/2017 Pelletier et al.
(Continued)

FOREIGN PATENT DOCUMENTS

CN 102986281 A 3/2013
CN 103024923 A 4/2013
(Continued)

OTHER PUBLICATIONS

"3rd Generation Partnership Project; Technical Specification Group Radio Access Network NR; Medium Access Control (MAC) Protocol Specification (Release 15)," 3GPP TS 38.321 V0.2.0, Aug. 2017, 36 pages.

*Primary Examiner* — Alex Skripnikov
(74) *Attorney, Agent, or Firm* — Slater Matsil, LLP

(57) ABSTRACT

An uplink transmission method and a terminal device, the method including setting, by a terminal device, a first transmit power for a first uplink channel based on a channel priority of the first uplink channel and a channel priority of a first physical random access channel PRACH, where the first uplink channel includes at least one of a physical uplink shared channel PUSCH and a physical uplink control channel PUCCH, a first time domain resource on which the first uplink channel is located and a second time domain resource on which the first PRACH is located overlap, the channel priority of the first uplink channel is higher than or equal to the channel priority of the first PRACH, and the first transmit power is greater than 0, and sending, by the terminal device, the first uplink channel at the first transmit power.

18 Claims, 6 Drawing Sheets

(51) Int. Cl.
*H04W 72/04* (2009.01)
*H04W 74/08* (2009.01)

(56) References Cited

U.S. PATENT DOCUMENTS

| | | | |
|---|---|---|---|
| 9,872,257 | B2 | 1/2018 | Yi |
| 10,536,910 | B2 | 1/2020 | Gaal et al. |
| 2013/0058315 | A1* | 3/2013 | Feuersanger ....... H04W 74/006 370/336 |
| 2013/0279433 | A1 | 10/2013 | Dinan |
| 2014/0321389 | A1 | 10/2014 | Zhang et al. |
| 2017/0223694 | A1* | 8/2017 | Han .................. H04W 72/1284 |

FOREIGN PATENT DOCUMENTS

| | | |
|---|---|---|
| CN | 103200663 A | 7/2013 |
| CN | 105682232 A | 6/2016 |
| CN | 106134263 A | 11/2016 |
| CN | 106376071 A | 2/2017 |
| EP | 2793514 A1 | 10/2014 |
| JP | 2016028475 A | 2/2016 |
| JP | 2017507583 A | 3/2017 |
| JP | 2017508370 A | 3/2017 |
| RU | 2627299 C1 | 8/2017 |
| WO | 2015139032 A1 | 9/2015 |
| WO | 2016167692 A1 | 10/2016 |

* cited by examiner

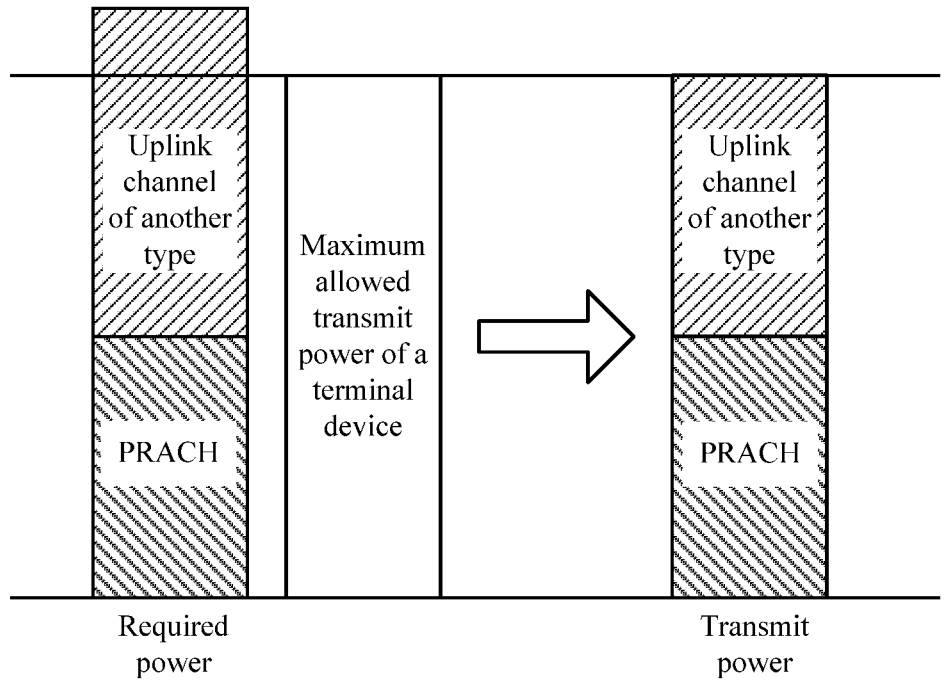

FIG. 3

A terminal device allocates a first transmit power to a first uplink channel based on a channel priority of the first uplink channel and a channel priority of a first physical random access channel PRACH, where the first uplink channel includes at least one of a physical uplink shared channel PUSCH and a physical uplink control channel PUCCH, a first time domain resource on which the first uplink channel is located and a second time domain resource on which the first PRACH is located overlap, the channel priority of the first uplink channel is higher than or equal to the channel priority of the first PRACH, and the first transmit power is greater than 0    S410

The terminal device sends the first uplink channel at the first transmit power    S420

FIG. 4

UPLINK TRANSMISSION METHOD, TERMINAL DEVICE, AND NETWORK DEVICE

CROSS-REFERENCE TO RELATED APPLICATIONS

This application is continuation application of International Application No. PCT/CN2018/098635, filed on Aug. 3, 2018, which claims priority to Chinese Patent Application No. 201710682571.1, filed on Aug. 10, 2017. The disclosures of the aforementioned applications are hereby incorporated by reference in their entireties.

TECHNICAL FIELD

This application relates to the wireless communications field, and more specifically, to an uplink transmission method, a terminal device, and a network device.

BACKGROUND

In a long term evolution (LTE) system and a long term evolution-advanced (LTE-A) system of a 4th generation (4G) mobile communications technology, a terminal device sends a physical uplink shared channel (PUSCH) based on uplink scheduling (Uplink Grant, UL grant) information of a network device, or sends a physical random access channel (PRACH) in a process of setting up a connection to the network device, or sends a physical uplink control channel (PUCCH), or sends a sounding reference signal (SRS), or the like.

To meet a requirement of human body health, a limitation is set on a maximum allowed transmit power of the terminal device. When a plurality of channels (for example, the PRACH, the PUSCH, the PUCCH and the SRS) need to be sent on a same time domain resource, due to the limitation of the maximum allowed transmit power, how to set a power is a problem to be resolved. A power setting principle is specified in a protocol of the 4G mobile communications technology.

Compared with the 4G mobile communications technology, there are a plurality of service types in a new radio (NR) system of a 5th generation (5G) mobile communications technology, and different service types correspond to different service requirements. For example, an ultra-reliable and low latency communications (URLLC) service requires a short latency and high reliability, that is, transmission is completed in 1 ms, an enhanced mobile broadband (eMBB) service has no latency requirement but requires high spectral efficiency, and a machine type communication (MTC) service requires periodic low-power transmission.

If the NR system still follows the protocol of the 4G mobile communications technology, channels of some types of services that require a short latency and high reliability fail to be transmitted, affecting service transmission quality.

SUMMARY

This application provides an uplink transmission method, a terminal device, and a network device, so that the terminal device can set a transmit power more properly, to improve service transmission quality.

According to a first aspect, an uplink transmission method is provided. The method includes setting, by a terminal device, a first transmit power for a first uplink channel based on a channel priority of the first uplink channel and a channel priority of a first physical random access channel PRACH, where the first uplink channel includes at least one of a physical uplink shared channel PUSCH and a physical uplink control channel PUCCH, a first time domain resource on which the first uplink channel is located and a second time domain resource on which the first PRACH is located overlap, the channel priority of the first uplink channel is higher than or equal to the channel priority of the first PRACH, and the first transmit power is greater than 0, and sending, by the terminal device, the first uplink channel at the first transmit power.

According to the uplink transmission method in the first aspect, when a time domain resource of the PUSCH and/or a time domain resource of the PUCCH overlap/overlaps the time domain resource of the first PRACH, a channel priority of the PUSCH and/or a channel priority of the PUCCH are/is set to be higher than or equal to the channel priority of the first PRACH, and the terminal device sets the first transmit power for the PUSCH and/or the PUCCH based on the channel priority, so that compared with an existing solution, the transmit power can be more preferentially set for the PUSCH and/or the PUCCH, and power setting is more proper and more suitable for the PUSCH and/or the PUCCH, thereby improving service transmission quality.

It should be understood that the first uplink channel may include one or more uplink channels, where lengths of time domain resources on which the first uplink channels are located may be the same or may be different, the first PRACH may include one or more PRACHs, and the first PRACH may be of a same system or may be of different systems.

It should be understood that the PUSCH may be a conventional PUSCH, or may be a short physical uplink shared channel (short PUSCH, sPUSCH), and a length of a time domain resource on which the sPUSCH is located is one symbol to one slot.

It should be understood that the PUCCH may be a conventional PUCCH, or may be a short physical uplink control channel, and a length of a time domain resource on which the sPUCCH is located is one symbol to one slot.

In a possible implementation of the first aspect, the first uplink channel includes at least one of the following PUSCHs: a grant-free PUSCH transmission a retransmitted PUSCH, a PUSCH corresponding to a first scheduling request, where the first scheduling request is used by the terminal device to request a first data transmission resource, a PUSCH corresponding to a first logical channel, a PUSCH that carries a transport block of a first transport block size, a PUSCH that carries a transport block of a first code rate, a PUSCH that carries a transport block of a first modulation scheme, and a PUSCH that carries information about a first latency requirement, where the first latency requirement is less than or equal to a first time threshold. In this possible implementation, the PUSCH is predefined to be at least one of the PUSCH corresponding to the scheduling request, the PUSCH corresponding to the logical channel, the PUSCH that carries the transport block of the transport block size, the PUSCH that carries the transport block of the code rate, and the PUSCH that carries the information about the latency requirement, and/or the PUSCH is predefined to be at least one of the grant-free PUSCH transmission and the retransmitted PUSCH. When the PUSCH conforms to a predefined condition, it is considered that the PUSCH is of relatively high importance, and the channel priority of the first uplink channel is higher than or equal to the channel priority of the first PRACH.

It should be understood that the first uplink channel includes the PUSCH that carries the transport block of the first transport block size, where the first transport block size is A bits (or A bytes), and A is a positive integer greater, or the first uplink channel includes the PUSCH that carries the transport block of the first transport block size, where a smallest value of the first transport block size is B bits (or B bytes), and B is a positive integer, or the first uplink channel includes the PUSCH that carries the transport block of the first transport block size, where a largest value of the first transport block size is C bits (or C bytes), and C is a positive integer, or the first uplink channel includes the PUSCH that carries the transport block of the first transport block size, where a range of the first transport block size is P to Q bits (or P to Q bytes), and P and Q are positive integers.

It should be understood that the first uplink channel includes the PUSCH that carries the transport block of the first code rate, where the first code rate is F, and F is a positive number, or the first uplink channel includes the PUSCH that carries the transport block of the first code rate, where a smallest value of the first code rate is G, and G is a positive number, or the first uplink channel includes the PUSCH that carries the transport block of the first code rate, where a largest value of the first code rate is H, and H is a positive number, or the first uplink channel includes the PUSCH that carries the transport block of the first code rate, where a range of the first code rate is I to J, and I and J are positive numbers.

In a possible implementation of the first aspect, the first uplink channel includes the PUCCH and/or the PUSCH, and the PUCCH and/or the PUSCH include/includes at least one of the following uplink control information: acknowledgement ACK information, information corresponding to a second latency requirement, where the second latency requirement is less than or equal to a second time threshold, and a second scheduling request, where the second scheduling request is used by the terminal device to request a second data transmission resource. In this possible implementation, when the PUCCH and/or the PUSCH includes at least one of the ACK information and predefined information about the second scheduling request, it is considered that the PUCCH and/or the PUSCH is of relatively high importance, and the channel priority of the first uplink channel is higher than or equal to the channel priority of the first PRACH.

In a possible implementation of the first aspect, the first PRACH includes at least one of the following PRACHs: a PRACH on a serving cell of a secondary time alignment group (sTAG), and a PRACH in a first format. In this possible implementation, when the first PRACH is on the serving cell of the sTAG and/or the first PRACH is in the first format, it is considered that the first PRACH is of relatively low importance, and the channel priority of the first uplink channel is higher than or equal to the channel priority of the first PRACH.

In a possible implementation of the first aspect, the setting, by a terminal device, a first transmit power for a first uplink channel based on a channel priority of the first uplink channel and a channel priority of a first PRACH includes setting, by the terminal device, the first transmit power for the first uplink channel based on a channel priority of a second PRACH, the channel priority of the first uplink channel, and the channel priority of the first PRACH, where the first time domain resource on which the first uplink channel is located, the second time domain resource on which the first PRACH is located, and a third time domain resource on which the second PRACH is located overlap, and the channel priority of the second PRACH is higher than the channel priority of the first uplink channel.

In a possible implementation of the first aspect, the method further includes discarding, by the terminal device, the first PRACH, and setting a second transmit power to 0 for the first PRACH.

In a possible implementation of the first aspect, the method further includes receiving, by the terminal device, first information, where the first information is used to instruct the terminal device to send the first PRACH, and the first information is configured in higher layer signaling or carried on a physical channel. In this possible implementation, when the first PRACH is a specific PRACH specified by using information, it is considered that the first PRACH is of relatively low importance, and the channel priority of the first uplink channel is higher than or equal to the channel priority of the first PRACH.

In a possible implementation of the first aspect, the method further includes receiving, by the terminal device, second information on the third time domain resource, where the second information is used to instruct the terminal device to send the first uplink channel on the first time domain resource, and the channel priority of the first uplink channel is higher than or equal to the channel priority of the first PRACH, or receiving, by the terminal device, second information on the third time domain resource, where the second information is used to instruct the terminal device to send the first uplink channel on the first time domain resource, and a time interval from a start moment of the third time domain resource to a start moment of the first time domain resource is less than or equal to a third time threshold. In this possible implementation, when the first uplink channel is explicitly or implicitly indicated as an important channel, and/or when a time interval from a time of sending the second information used to schedule the first uplink channel to a time of sending the first uplink channel is less than a specific threshold, it is considered that the first uplink channel is of relatively high importance, and the channel priority of the first uplink channel is higher than or equal to the channel priority of the first PRACH.

In a possible implementation of the first aspect, a length of the first time domain resource is a first time length, and/or a subcarrier spacing of a frequency domain resource on which the first uplink channel is located is a first subcarrier spacing, and/or a length of the second time domain resource is a second time length, and/or a subcarrier spacing of a frequency domain resource on which the first PRACH is located is a second subcarrier spacing, and/or the first uplink channel is a first uplink channel retransmitted for a $K^{th}$ time, where K is an integer greater than or equal to 1. In this possible implementation, when the first uplink channel uses a specific time length and/or a specific subcarrier spacing, the first PRACH uses a specific time length and/or a specific subcarrier spacing, and/or the first uplink channel is retransmitted for the $K^{th}$ time, it is considered that the first uplink channel is of relatively high importance, and the channel priority of the first uplink channel is higher than or equal to the channel priority of the first PRACH.

In a possible implementation of the first aspect, the method further includes setting, by the terminal device, a second transmit power for the first PRACH based on the channel priority of the first uplink channel and the channel priority of the first PRACH, where a sum of the first transmit power and the second transmit power is less than or equal to a maximum allowed transmit power of the terminal device, and the second transmit power is greater than 0, and sending, by the terminal device, the first PRACH at the second transmit power.

In a possible implementation of the first aspect, the second transmit power is less than a required power of the first PRACH.

In a possible implementation of the first aspect, a sum of a required power of the first uplink channel and the required power of the first PRACH is greater than a first available power value, the first available power value is less than or equal to the maximum allowed transmit power, and the sum of the first transmit power and the second transmit power is less than or equal to the first available power value.

In a possible implementation of the first aspect, the first available power value is an available transmit power of the terminal device minus a required power of the second PRACH.

According to a second aspect, a terminal device is provided, configured to perform the method in the first aspect or any possible implementation of the first aspect. Specifically, the terminal device may include a module configured to perform the method according to the first aspect or any possible implementation of the first aspect.

According to a third aspect, a communications apparatus is provided. The communications apparatus may be a terminal device, or may be a chip disposed in the terminal device. The communications apparatus includes a processor and a memory, where the memory is configured to store an instruction, the processor is configured to execute the instruction stored in the memory, and execution of the instruction stored in the memory enables the communications apparatus to perform the method according to the first aspect or any possible implementation of the first aspect. Certainly, the communications apparatus may further include a transceiver, where the transceiver is in communication connection to the processor and/or the memory, to receive and send data.

According to a fourth aspect, a computer storage medium is provided, where the computer storage medium stores an instruction, and when the instruction is run on a computer, the computer is enabled to perform the method according to the first aspect or any possible implementation of the first aspect.

According to a fifth aspect, a computer program product including an instruction is provided, and when the instruction of the computer program product is run on a computer, the computer performs the method according to the first aspect or any possible implementation of the first aspect.

According to a sixth aspect, an uplink transmission method is provided. The method includes sending, by a network device, first information, where the first information is used to instruct a terminal device to send a first PRACH, the first information is configured in higher layer signaling or carried on a physical channel, a second time domain resource on which the first PRACH is located and a first time domain resource on which a first uplink channel is located overlap, the first uplink channel includes at least one of a physical uplink shared channel PUSCH and a physical uplink control channel PUCCH, and a channel priority of the first uplink channel is higher than or equal to a channel priority of the first PRACH, and detecting, by the network device, the first PRACH on the second time domain resource.

According to the uplink transmission method in the sixth aspect, the network device instructs the terminal device to send the first PRACH. When a time domain resource of the PUSCH and/or a time domain resource of the PUCCH overlap/overlaps the time domain resource of the first PRACH, a channel priority of the PUSCH and/or a channel priority of the PUCCH are/is set to be higher than or equal to the channel priority of the first PRACH, so that compared with an existing solution, the terminal device can more preferentially set a transmit power for the PUSCH and/or the PUCCH, and power setting is more proper and more suitable for the PUSCH and/or the PUCCH, thereby improving service transmission quality.

According to a seventh aspect, an uplink transmission method is provided. The method includes sending, by a network device, second information on a third time domain resource, where the second information is used to instruct a terminal device to send a first uplink channel on a first time domain resource, and a channel priority of the first uplink channel is higher than or equal to a channel priority of a first PRACH, or sending, by a network device, second information on a third time domain resource, where the second information is used to instruct a terminal device to send a first uplink channel on a first time domain resource, and a time interval from a start moment of the third time domain resource to a start moment of the first time domain resource is less than or equal to a third time threshold, where the first uplink channel includes at least one of a physical uplink shared channel PUSCH and a physical uplink control channel PUCCH, the first time domain resource and a second time domain resource on which the first PRACH is located overlap, and the channel priority of the first uplink channel is higher than or equal to the channel priority of the first PRACH, and detecting, by the network device, the first uplink channel on the first time domain resource.

According to the uplink transmission method in the seventh aspect, the network device instructs the terminal device to send the first uplink channel. When a time domain resource of the PUSCH and/or a time domain resource of the PUCCH overlap/overlaps the time domain resource of the first PRACH, the first uplink channel is explicitly or implicitly indicated as an important channel, and/or when a time interval from a time of sending the second information used to schedule the first uplink channel to a time of sending the first uplink channel is less than a specific threshold, the first uplink channel is implicitly indicated as of relatively high importance, and the channel priority of the first uplink channel is higher than or equal to the channel priority of the first PRACH, so that compared with an existing solution, the terminal device can more preferentially set a transmit power for the PUSCH and/or the PUCCH, and power setting is more proper and more suitable for the PUSCH and/or the PUCCH, thereby improving service transmission quality.

According to an eighth aspect, a network device is provided, configured to perform the method in the sixth aspect or the seventh aspect. Specifically, the network device may include a module configured to perform the method in the sixth aspect or the seventh aspect.

According to a ninth aspect, a communications apparatus is provided. The communications apparatus may be a network device, or may be a chip disposed in the network device. The communications apparatus includes a processor and a memory, where the memory is configured to store an instruction, the processor is configured to execute the instruction stored in the memory, and execution of the instruction stored in the memory enables the communications apparatus to perform the method in the sixth aspect or the seventh aspect. Certainly, the communications apparatus may further include a transceiver, where the transceiver is in communication connection to the processor and/or the memory, to receive and send data.

According to a tenth aspect, a computer storage medium is provided, where the computer storage medium stores an instruction, and when the instruction is run on a computer, the computer is enabled to perform the method in the sixth aspect or the seventh aspect.

According to an eleventh aspect, a computer program product including an instruction is provided, and when the instruction in the computer program product is run on a computer, the computer performs the method in the sixth aspect or the seventh aspect.

Effects that can be obtained according to the second aspect to the eleventh aspect correspond to effects that can be obtained according to the first aspect. Details are not described herein again.

BRIEF DESCRIPTION OF THE DRAWINGS

FIG. 3 is a schematic diagram of a power setting method;

FIG. 4 is a schematic flowchart of an uplink transmission method according to an embodiment of this application;

DETAILED DESCRIPTION OF ILLUSTRATIVE EMBODIMENTS

Figure 1:
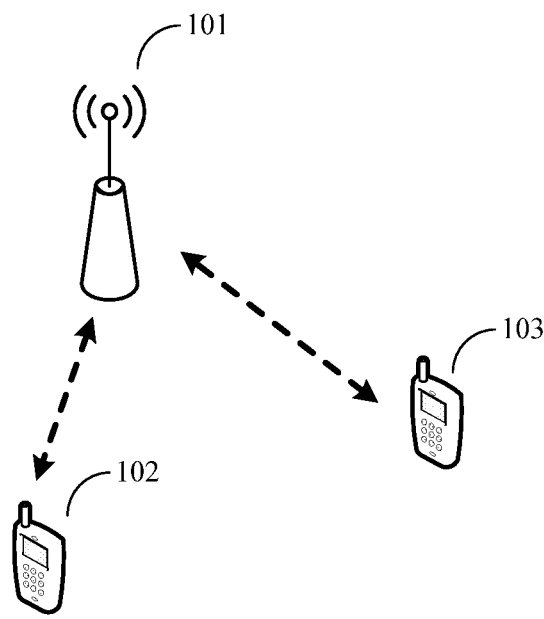
FIG. 1 is a schematic diagram of an application scenario to which solutions of embodiments of this application can be applied.

The following describes technical solutions of this application with reference to accompanying drawings.

Embodiments of this application may be applied to a plurality of wireless communications systems, for example, a global system for mobile communications (GSM), a code division multiple access (CDMA) system, a wideband code division multiple access (WCDMA) system, a general packet radio service (GPRS) system, and a universal mobile telecommunications system (UMTS), and are especially applied to an LTE system, an LTE-A system, and an NR system.

This application describes the embodiments with reference to a network device and a terminal device.

The terminal device may also be referred to as user equipment (UE), an access terminal, a subscriber unit, a subscriber station, a mobile station, a mobile console, a subscriber station, a remote terminal, a mobile device, a user terminal, a terminal, a wireless communications device, a user agent, or a user apparatus. The terminal device may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device, or another processing device connected to a wireless modem, an in-vehicle device, or a wearable device, or may be a terminal device in a next generation communications system such as a 5G system, a terminal device in a future evolved public land mobile network (PLMN), a terminal device in the NR system, or the like.

By way of example rather than limitation, in the embodiments of this application, the terminal device may be a wearable device. The wearable device may also be referred to as a wearable intelligent device, and is a generic term of devices that can be worn and that are developed based on intelligent design of routine wearing by using a wearable technology, for example, glasses, gloves, watches, clothes, or shoes. The wearable device is a portable device directly worn on a human body or integrated in clothes or accessories of a user. The wearable device is not merely a hardware device, but implements a powerful function through software support, data exchange, and cloud exchange. In a broad sense, the wearable intelligent device includes a device that provides a complete function, has a large size, and can implement all or some functions without relying on a smartphone, for example, a smartwatch or smart glasses, and includes a device that focuses only on a specific type of application function and needs to be used in combination with another device such as a smartphone, for example, various smart bands and smart jewelry used for vital sign monitoring.

The network device may be a device configured to communicate with a mobile device. For example, the network device may be an access point (AP) in the WLAN, a base transceiver station (BTS) in the GSM or CDMA, or may be a NodeB (NB) in WCDMA, or may be an evolved NodeB (evolved Node B, eNB or eNodeB) in LTE, or may be a relay node, an access point, an in-vehicle device, a wearable device and a network device in the future 5G system, or a network device in the future evolved PLMN, or a new generation NodeB (gNodeB) in the NR system.

In the embodiments of this application, the network device provides a service for a cell, and the terminal device communicates with the network device by using a transmission resource (for example, a frequency domain resource, or referred to as a spectrum resource) used by the cell. The cell may be a cell corresponding to the network device (for example, a base station). The cell may belong to a macro base station, or a base station corresponding to a small cell. The small cell herein may include a metro cell, a micro cell, a pico cell, a femto cell, or the like. These small cells are characterized by small coverage and a low transmit power, and are suitable for providing a high-rate data transmission service.

In addition, a plurality of cells may work in a same frequency on a carrier of the LTE system or the NR system. In some special scenarios, it may be considered that a concept of the carrier is the same as that of the cell. For example, in a carrier aggregation (CA) scenario, when a secondary component carrier is configured for a terminal device, both a carrier index of the secondary component carrier and a cell identifier (Cell ID) of a secondary cell that works on the secondary component carrier are carried. In this case, it may be considered that the concept of the carrier is the same as that of the cell, for example, that the terminal device accesses a carrier is equivalent to that the terminal device accesses a cell.

A method and a device that are provided in the embodiments of this application can be applied to the terminal device or the network device, and the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more of computer operating systems that implement service processing through a process, for example, a Linux operating system, a Unix operating system, an Android operating system, an iOS operating system, or a windows operating system. The application layer includes applications such as a browser, contacts, word processing software, and instant messaging software. In addition, a specific structure of an execution body of the method provided in the embodiments of this application is not specially limited in the embodiments of this application, provided that a program recording code of the method provided in the embodiments of the present invention can be run to perform communication according to the method provided in the embodiments of this application. For example, the execution body of the method provided in the embodiments of this application may be the terminal device or the network device, or a function module that can invoke a program and execute the program in the terminal device or the network device.

In addition, aspects or features in the embodiments of this application may be implemented as a method, a device, or a product that uses standard programming and/or engineering technologies. The term "product" used in this application covers a computer program that can be accessed from any computer readable component, carrier, or medium. For example, a computer readable medium may include but is not limited to a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine readable media that are configured to store information. The term "machine readable medium" may include but is not limited to a radio channel, and various other media that can store, contain, and/or transmit an instruction and/or data.

FIG. 1 is a schematic diagram of an application scenario to which solutions of embodiments of this application can be applied. As shown in FIG. 1, the application scenario includes a cell base station 101, and a terminal device 102 and a terminal device 103 that are in coverage of the cell base station 101 and that communicate with the cell base station 101. The cell base station 101 may be an evolved NodeB in an LTE system, the terminal device 102 and the terminal device 103 may be terminal devices in the corresponding LTE system, both the cell base station 101 and the terminal device 102 are devices that support short transmission time interval (TTI) transmission, and the terminal device 103 is a device that does not support the short TTI (sTTI) transmission. The cell base station 101 may communicate with the terminal device 102 separately by using a short TTI or a normal one-millisecond (ms) TTI. The cell base station 101 may communicate with the terminal device 103 by using a normal 1-ms TTI.

The following briefly describes some concepts and technologies in this application.

Uplink transmission and downlink transmission in the LTE-A system.

Time domain in the LTE-A system is identified by using a radio frame (Radio Frame). Each radio frame includes ten 1 ms subframes, and each subframe includes two slots (slot). For a normal cyclic prefix (normal CP), each slot includes seven symbols (symbol), and for an extended cyclic prefix, each slot includes six symbols. A resource element (RE) is a smallest time-frequency resource unit in the LTE-A system, includes one symbol in time domain, and includes one subcarrier in frequency domain. An uplink symbol of the LTE-A system is a single-carrier frequency division multiple access (SC-FDMA) symbol, and a downlink symbol is an orthogonal frequency division multiplexing (OFDM) symbol. It should be noted that an uplink multiple access manner of orthogonal frequency division multiple access (OFDMA) is introduced in a subsequent technology of the LTE-A system, and therefore, the uplink symbol may be alternatively an OFDM symbol. In this application, an uplink symbol and a downlink symbol each are briefly referred to as a symbol. Data packets whose TTIs are shortened to one symbol to 0.5 ms are collectively referred to as sTTI data packets, or a data packet whose TTI is not greater than 1 ms is referred to as an sTTI data packet.

Uplink Transmission and Downlink Transmission in an NR System.

In the NR system, each subframe includes a plurality of OFDM symbols or a plurality of SC-FDMA symbols, but a length of the subframe may not be 1 ms, and this depends on a value of a subcarrier spacing. If the subcarrier spacing is 15 kHz, the length of the subframe is 1 ms, or if the subcarrier spacing is greater than 15 kHz, the length of the subframe may be less than 1 ms. The NR system may include transmission of a plurality of subcarrier spacings, and different subcarrier spacing configurations are referred to as different numerologies. In other words, in different numerologies, time lengths of symbols are different.

Higher Layer Signaling.

The higher layer signaling may be signaling sent by an upper-layer protocol layer, and the upper-layer protocol layer is at least one of protocol layers above a physical layer. The upper-layer protocol layer may be specifically at least one of the following protocol layers: a medium access control (MAC) layer, a radio link control (RLC) layer, a packet data convergence protocol (PDCP) layer, a radio resource control (RRC) layer, a non-access stratum (NAS), and the like.

Grant-Free Transmission.

There are a plurality of service types in an NR system of a 5G mobile communications technology, and different service types correspond to different service requirements. Therefore, grant-free (grant-free or grant-less) transmission is introduced in the NR system. In the embodiments of this application, grant-free transmission may be understood as any one or more of following meanings, or may be understood as a combination of some technical features in the following plurality of meanings, or another similar meaning.

The grant-free transmission may be as follows. The network device pre-allocates a plurality of transmission resources to the terminal device and notifies the terminal device of the plurality of transmission resources. When there is an uplink data transmission demand, the terminal device selects at least one transmission resource from the plurality of transmission resources pre-allocated by the network device, and sends uplink data by using the selected transmission resource. The network device detects, on one or more transmission resources in the pre-allocated plurality of transmission resources, the uplink data sent by the terminal device. The detection may be blind detection, or may be detection performed based on a control field in the uplink data, or may be detection performed in another manner.

The grant-free transmission may be as follows. The network device pre-allocates a plurality of transmission resources to the terminal device and notifies the terminal device of the plurality of transmission resources, so that when there is an uplink data transmission demand, the terminal device selects at least one transmission resource from the plurality of transmission resources pre-allocated by the network device, and sends uplink data by using the selected transmission resource.

The grant-free transmission may be as follows. The terminal device obtains information about a plurality of pre-allocated transmission resources, and when there is an uplink data transmission demand, selects at least one transmission resource from the plurality of transmission resources, and sends uplink data by using the selected transmission resource. The plurality of transmission resources may be obtained from the network device or may be predefined.

The grant-free transmission may refer to a method of implementing uplink data transmission of the terminal device without dynamic scheduling of the network device. The dynamic scheduling may be a scheduling manner in which the network device indicates, by using signaling, a transmission resource for each uplink data transmission of the terminal device. Optionally, implementation of uplink data transmission of the terminal device may be understood as that uplink data transmission of data of two or more terminal devices is allowed on a same time-frequency resource. Optionally, the transmission resource may be a transmission resource of one or more time domain resources after a moment at which the terminal device receives the signaling.

The grant-free transmission may mean that the terminal device performs uplink data transmission without granting of the network device. The granting may be as follows. The terminal device sends an uplink scheduling request to the network device, and the network device sends an uplink grant to the terminal device after receiving the scheduling request, where the uplink grant indicates an uplink transmission resource allocated to the terminal device.

The grant-free transmission may be a contention-based transmission manner, and may be specifically as follows. A plurality of terminals simultaneously perform uplink data transmission on a same pre-allocated time-frequency resource without granting of a base station.

In the LTE system and the LTE-A system, cases in which the terminal device sends a PRACH, a PUSCH, and a PUCCH are as follows.

Sending of the PUSCH.

Currently, in the LTE system and the LTE-A system, the terminal device sends the PUSCH based on scheduling. The terminal device receives, in a subframe n, uplink scheduling (UL grant) information carried on a physical downlink control channel (PDCCH) sent by the network device. The terminal device sends the PUSCH in a subframe n+4 at earliest based on the uplink scheduling information.

Sending of the PUCCH.

(1) Sending of a hybrid automatic repeat request (HARQ) including an acknowledgement (ACK) or a negative acknowledgement (NACK).

The terminal device receives, in a subframe n, a PDSCH and a PDCCH that are sent by the network device, where the PDSCH and the PDCCH may carry downlink scheduling (Downlink grant, DL grant) information, and the terminal device generates an ACK or a NACK based on a status of decoding the PDSCH, and sends the PUCCH in a subframe n+4 at earliest.

(2) Aperiodic sending of channel state information (CSI).

The terminal device receives, in a subframe n, UL grant or DL grant carried on a PDCCH. The terminal device sends the PUCCH in a subframe n+4 or a subframe n+5 based on indication information of the PDCCH.

(3) Periodic sending of CSI. The terminal device periodically sends the PUCCH.

(4) Sending of a scheduling request. When uplink data needs to be sent, the terminal device waits for a sending period time point of the scheduling request, and sends the PUCCH at the sending period time point of the scheduling request.

Sending of the PRACH.

(1) The terminal device itself may determine to send the PRACH, or sends the PRACH based on triggering of a PDCCH sent by the network device, or sends the PRACH based on triggering of radio resource control (RRC) signaling sent by the network device. The PRACH may be used for synchronization between the terminal device and the network device, cell handover, or the like.

(2) A process of setting up a connection between the terminal device and the network device is a random access process, and the terminal device sends the PRACH in the random access process. The random access process specifically includes the following steps. The terminal device sends a random access preamble to the network device by using the PRACH. After receiving the random access preamble, the network device replies to the terminal device with a random access response (RAR) by using a PDSCH. Then, the terminal device sends a message 3 in the random access process by using the PUSCH. Finally, the network device replies to the terminal device with a contention resolution message. In the random access process, the network device and the terminal device transmit messages in a basic transmission unit of a 1 ms TTI.

In the LTE system and the LTE-A system, power setting of each channel by the terminal device is as follows.

In standards (or protocols) of the LTE system and the LTE-A system, each channel has a channel priority. A principle of designing channel priorities of the channels is to ensure preferential sending of an important channel. It is specified in the standard that a power is preferentially set for an uplink channel having a high channel priority, and then a power is set for an uplink channel having a low channel priority, and if more than one uplink channel has a same channel priority, power compression is performed for the plurality of uplink channels at a same ratio.

For example, a maximum allowed transmit power of the terminal device is 100 shares in power, a required power of a first uplink channel is 50 shares in power, a required power of a second uplink channel is 70 shares in power, and a required power of a third uplink channel is 30 shares in power.

It is assumed that channel priorities are a channel priority of the first uplink channel>a channel priority of the second uplink channel=a channel priority of the third uplink channel. The terminal device preferentially sets a transmit power to 50 shares for the first uplink channel, and 100−50=50 shares in power remain. The terminal device then sets transmit powers for the second uplink channel and the third uplink channel. Because the second uplink channel and the third uplink channel have the same channel priority, A*(the required power of the second uplink channel+the required power of the third uplink channel)=50, and it can be obtained through calculation that A=0.5. Therefore, the terminal device sets a power to 0.5*70=35 shares for the second uplink channel, and sets a power to 0.5*30=15 shares for the third uplink channel.

For a case in which the PRACH and an uplink channel of another type (for example, the PUSCH and/or the PUCCH) need to be sent in a same subframe, specifications in the LTE system and LTE-A system standards are specifically as follows.

Figure 2:
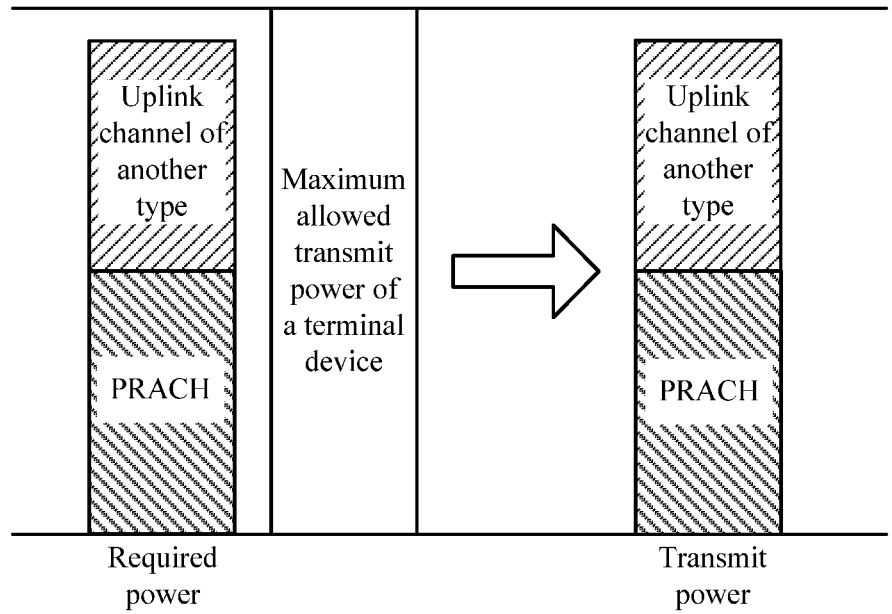
FIG. 2 is a schematic diagram of a power setting method.

(i) FIG. 2 is a schematic diagram of a power setting method. As shown in FIG. 2, if a required power of the PRACH plus a required power of the uplink channel of the another type does not exceed the maximum allowed transmit power of the terminal device, the terminal device sends the PRACH by using the required power of the PRACH as a transmit power of the PRACH, and sends the uplink channel of the another type by using the required power of the uplink channel of the another type as a transmit power of the uplink channel of the another type.

(2) FIG. 3 is a schematic diagram of a power setting method. As shown in FIG. 3, if a required power of the PRACH plus a required power of the uplink channel of the another type exceeds the maximum allowed transmit power of the terminal device, the terminal device preferentially ensures a transmit power of the PRACH. If there is a power remaining after the transmit power of the PRACH is subtracted from the maximum allowed transmit power of the terminal device, the remaining power is set for the uplink channel of the another type. Relative to the required power of the uplink channel of the another type, the transmit power that is set for the uplink channel of the another type is a power obtained after compression.

It should be understood that in the embodiments of this application, a required power is a power that is obtained by the terminal device through calculation based on a parameter set and that is used to send a channel when the maximum allowed transmit power of the terminal device or a current remaining available transmit power of the terminal device is not considered, where the parameter set includes at least one of the following parameters: a path loss value, an initially configured transmit power value of the channel, a power control adjustment status variable, a beam parameter, and a channel transmission format. A transmit power is an actual power used by the terminal device to send a channel, or may be a power used by the terminal device to send a channel after power adjustment.

There are a plurality of service types in the NR system of the 5G mobile communications technology, and different service types correspond to different service requirements. For example, a URLLC service or the like requires a short latency and high reliability. If the NR system still follows protocols of the LTE system and the LTE-A system, a channel of the URLLC service fails to be transmitted, and power setting of the terminal device is improper, affecting transmission quality of an important service.

To resolve the foregoing problem, an embodiment of this application provides an uplink transmission method. FIG. 4 is a schematic flowchart of an uplink transmission method 400 according to an embodiment of this application. The uplink transmission method 400 is performed by a terminal device, and includes the following steps.

S410. The terminal device sets a first transmit power for a first uplink channel based on a channel priority of the first uplink channel and a channel priority of a first physical random access channel PRACH, where the first uplink channel includes at least one of a physical uplink shared channel PUSCH and a physical uplink control channel PUCCH, a first time domain resource on which the first uplink channel is located and a second time domain resource on which the first PRACH is located overlap, the channel priority of the first uplink channel is higher than or equal to the channel priority of the first PRACH, and the first transmit power is greater than 0.

S420. The terminal device sends the first uplink channel at the first transmit power.

It should be noted that, that the first time domain resource on which the first uplink channel is located and the second time domain resource on which the first PRACH is located overlap means that the first time domain resource and the second time domain resource partially or completely overlap in time domain.

According to the uplink transmission method in this embodiment of this application, when a time domain resource of the PUSCH and/or a time domain resource of the PUCCH overlap/overlaps the time domain resource of the first PRACH, a channel priority of the PUSCH and/or a channel priority of the PUCCH are/is set to be higher than or equal to the channel priority of the first PRACH, and the terminal device sets the first transmit power for the PUSCH and/or the PUCCH based on the channel priority, so that compared with an existing solution, the transmit power can be more preferentially set for the PUSCH and/or the PUCCH, and power setting is more proper and more suitable for the PUSCH and/or the PUCCH, thereby improving service transmission quality.

It should be understood that in this embodiment of this application, the first uplink channel may include one or more uplink channels, where lengths of time domain resources on which the first uplink channels are located may be the same or may be different. For example, the first uplink channel may include a one-symbol uplink channel, or may include a two-symbol uplink channel, or may include a seven-symbol uplink channel, or may include a 14-symbol uplink channel. The first PRACH may include one or more PRACHs, and the first PRACH may be of a same system or may be of different systems, for example, an NR PRACH and/or an LTE PRACH.

It should be further understood that in the embodiments of this application, the PUSCH may be a conventional PUSCH, or may be a short physical uplink shared channel (short PUSCH, sPUSCH), and a length of a time domain resource on which the sPUSCH is located is one symbol to one slot.

It should be further understood that in the embodiments of this application, the PUCCH may be a conventional PUCCH, or may be a short physical uplink control channel (short PUCCH, sPUCCH), and a length of a time domain resource on which the sPUSCH is located is one symbol to one slot.

Figure 5:
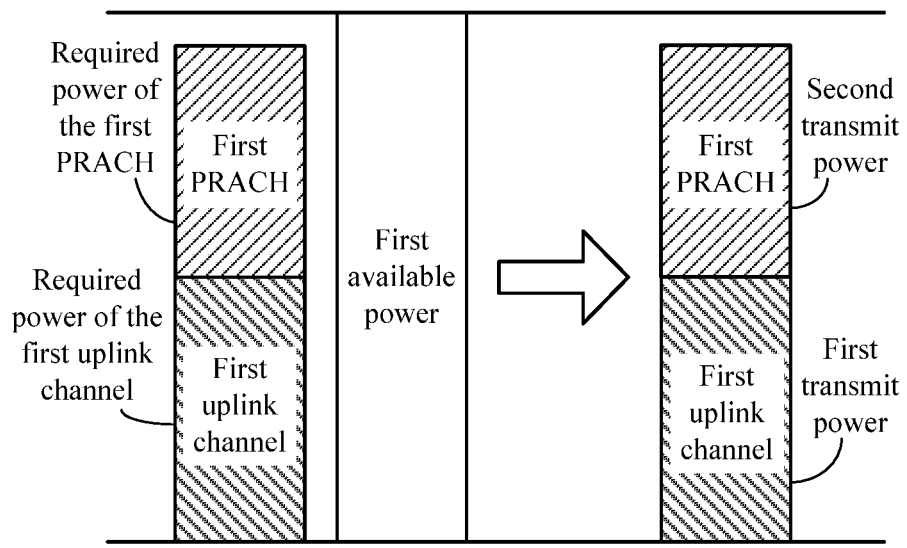
FIG. 5 is a schematic diagram of an uplink transmission method according to an embodiment of this application.
Figure 6:
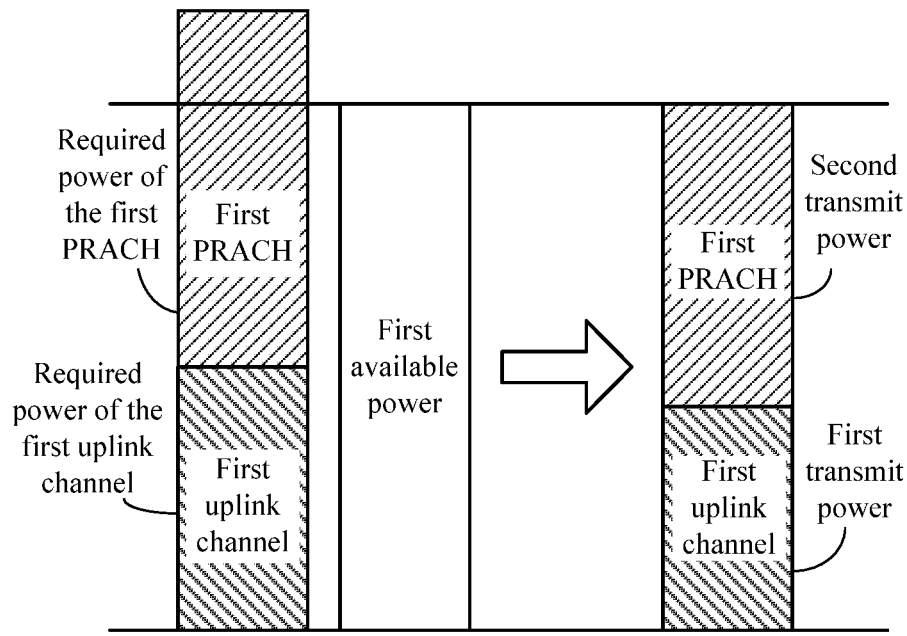
FIG. 6 is a schematic diagram of an uplink transmission method according to another embodiment of this application.

FIG. 5 and FIG. 6 are respectively schematic diagrams of the uplink transmission method in this embodiment of this application. In this embodiment of this application, when the channel priority of the first uplink channel is equal to the channel priority of the first PRACH, as shown in FIG. 5, if a sum of a required power of the first uplink channel and a required power of the first PRACH is less than or equal to a first available power value, the terminal device uses the required power of the first uplink channel as the first transmit power of the first uplink channel, and uses the required power of the first PRACH as a second transmit power of the first PRACH, and as shown in FIG. 6, if a sum of a required power of the first uplink channel and a required power of the first PRACH is greater than a first available power value, the terminal device compresses the required power of the first uplink channel and the required power of the first PRACH at a same ratio, and respectively uses a compressed required power of the first uplink channel and a compressed required power of the first PRACH as the first transmit power and a second transmit power.

Figure 7:
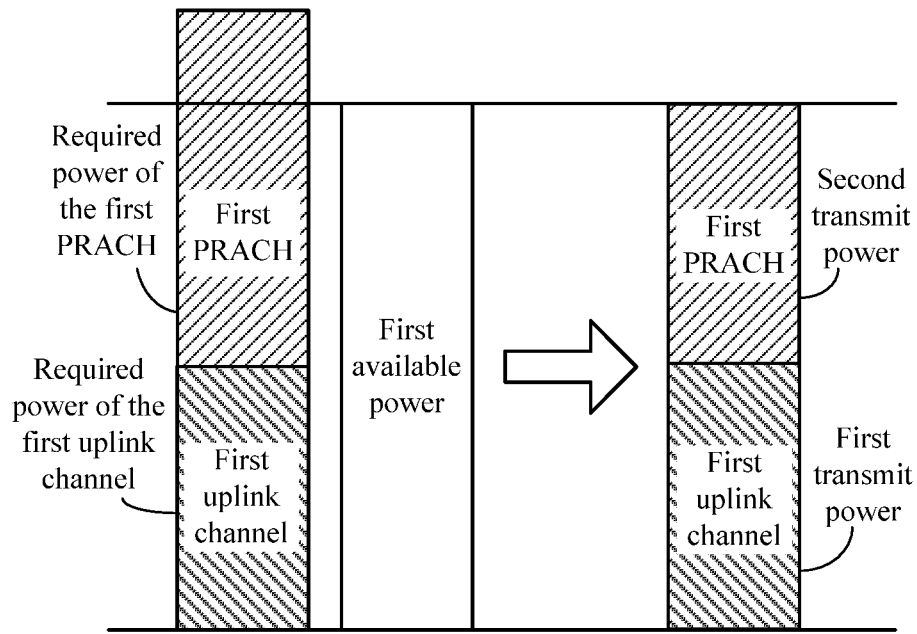
FIG. 7 is a schematic diagram of an uplink transmission method according to another embodiment of this application.
Figure 8:
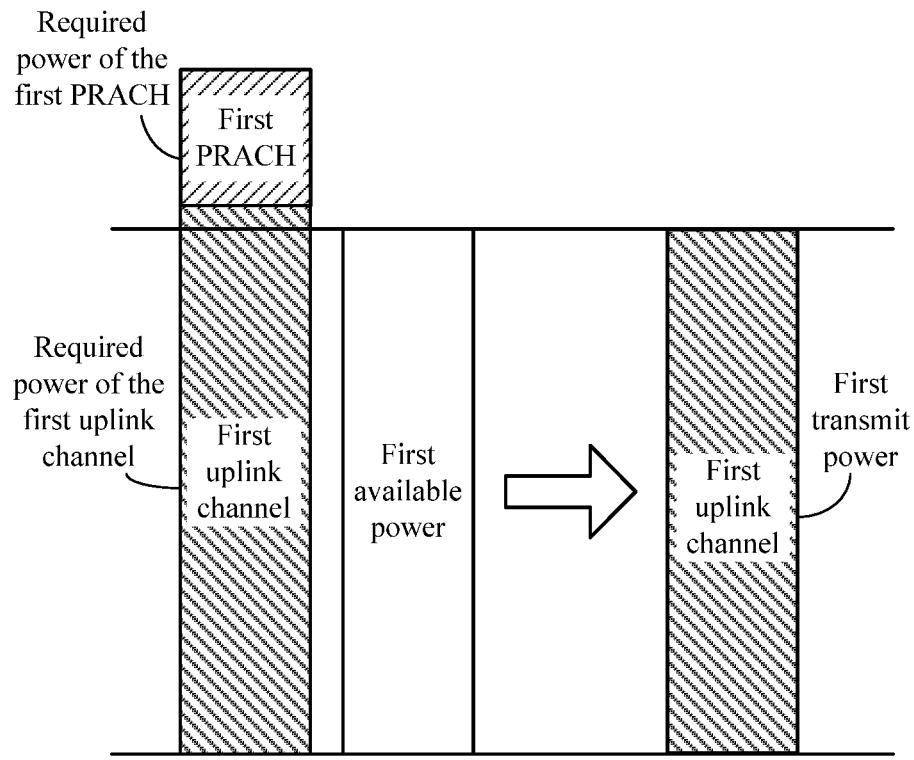
FIG. 8 is a schematic diagram of an uplink transmission method according to another embodiment of this application.

FIG. 7 and FIG. 8 are respectively schematic diagrams of the uplink transmission method in this embodiment of this application. In this embodiment of this application, when the channel priority of the first uplink channel is higher than the channel priority of the first PRACH, the terminal device preferentially sets, from a first available power value, the first transmit power for the first uplink channel. If a sum of a required power of the first uplink channel and a required power of the first PRACH is less than or equal to the first available power value, the terminal device uses the required power of the first uplink channel as the first transmit power of the first uplink channel, and uses the required power of the first PRACH as a second transmit power of the first PRACH. If a sum of a required power of the first uplink channel and a required power of the first PRACH is greater than the first available power value, after the terminal device sets the first transmit power for the first uplink channel, as shown in FIG. 7, if there is a power of the first available power value remaining, the terminal device sets a second transmit power for the first PRACH, where the second transmit power is greater than 0. It may be understood that if there is a power of the first available power value remaining, but the power is less than the required power of the first PRACH, the terminal device may alternatively give up sending the first PRACH. As shown in FIG. 8, if there is no power of the first available power value remaining, the terminal device gives up sending the first PRACH, or sets the second transmit power to 0.

It should be understood that in the embodiments of this application, the first available power value may be a transmit power that can be set by the terminal device at least for the first uplink channel. If there is a power remaining after the power is set for the first uplink channel, the first available power value may be a transmit power that can be set for the first uplink channel and the first PRACH. The first available power value may be dynamically determined by the terminal device based on an overlapping status of the time domain resources of the channels, or may be determined by the terminal device based on indication information or a higher layer signaling message sent by the network device, or may be a preset threshold. This is not limited in this embodiment of this application.

It should be understood that in this embodiment of this application, that the first time domain resource on which the first uplink channel is located and the second time domain resource on which the first PRACH is located overlap means that the first time domain resource and the second time domain resource completely or partially overlap. It may be understood that a length of the first time domain resource and a length of the second time domain resource may be the same or may be different.

It should be further understood that when the terminal device needs to send only the first uplink channel and the first PRACH on an overlapping time domain resource, and does not need to send any other channel, the first available power value is a maximum allowed transmit power of the terminal device, and in addition to the first uplink channel and the first PRACH, when the terminal device further needs to send another channel on an overlapping time domain resource, the first available power value may be less than or equal to a maximum allowed transmit power of the terminal device.

Therefore, a case that this application focuses on is as follows. The uplink transmission method further includes setting, by the terminal device, the second transmit power for the first PRACH based on the channel priority of the first uplink channel and the channel priority of the first PRACH, where the sum of the first transmit power and the second transmit power is less than or equal to the maximum allowed transmit power of the terminal device, and the second transmit power is greater than 0, and sending, by the terminal device, the first PRACH at the second transmit power.

Another case that this application focuses on is as follows. When the sum of the required power of the first uplink channel and the required power of the first PRACH is greater than the first available power value, because the channel priority of the first uplink channel is higher than or equal to the channel priority of the first PRACH, the second transmit power is less than the required power of the first PRACH.

In this embodiment of this application, when the sum of the required power of the first uplink channel and the required power of the first PRACH is greater than the first available power value, the sum of the first transmit power and the second transmit power is less than or equal to the first available power value. For example, when the first time domain resource on which the first uplink channel is located, the second time domain resource on which the first PRACH is located, and a time domain resource on which a PRACH having a higher channel priority is located overlap, the channel priorities in this case are the channel priority of the PRACH having a higher channel priority>the channel priority of the first uplink channel the channel priority of the first PRACH. In this case, an available transmit power of the terminal device is the first available power value, and the sum of the first transmit power and the second transmit power is less than the first available power value. For example, when the time domain resource on which the first uplink channel is located, the time domain resource on which the first PRACH is located, and the time domain resource on which the PRACH having a higher channel priority is located overlap, the channel priorities are the channel priority of the PRACH having a higher channel priority>the channel priority of the first uplink channel the channel priority of the first PRACH. In this case, an available transmit power of the terminal device is the first available power value plus a required power value of the PRACH having a higher channel priority, and the terminal device may choose to discard the first PRACH or compress the first PRACH. If the first PRACH is discarded, in current transmission, the second transmit power is 0, and the sum of the first transmit power and the second transmit power may be less than or equal to the first available power value, or if the first PRACH is compressed, the sum of the first transmit power and the second transmit power in current transmission is equal to the first available power value. It should be noted that, that the first time domain resource on which the first uplink channel is located, the second time domain resource on which the first PRACH is located, and the time domain resource on which the PRACH having a higher channel priority is located overlap means that the first time domain resource, the second time domain resource, and the time domain resource on which the PRACH having a higher channel priority is located partially or completely overlap in time domain, or that the first time domain resource, the second time domain resource, and the time domain resource on which the PRACH having a higher channel priority is located have a intersection in time domain.

In this embodiment of this application, when the sum of the required power of the first uplink channel and the required power of the first PRACH is greater than the first available power value, the sum of the first transmit power and the second transmit power is less than or equal to the first available power value. For example, when the first uplink channel includes the PUSCH and the PUCCH, the PUSCH is located on a first time domain resource #1, the PUCCH is located on a first time domain resource #2, the first time domain resource includes the first time domain resource #1 and the first time domain resource #2, where the first time domain resource #1 and the first time domain resource #2 may be the same or may be different. When the first time domain resource #1 on which the PUSCH is located, the first time domain resource #2 on which the PUCCH is located, and the second time domain resource on which the first PRACH is located overlap, channel priorities in this case may be the channel priority of the PUSCH=the channel priority of PUCCH≥the channel priority of the first PRACH, or may be the channel priority of the PUCCH>the channel priority of the PUSCH≥the channel priority of the first PRACH, or may be the channel priority of the PUSCH>the channel priority of the PUCCH the channel priority of the first PRACH. In this case, the available transmit power of the terminal device is the first available power value, a sum of a transmit power of the PUCCH and a transmit power of the PUSCH is the first transmit power, and the sum of the first transmit power and the second transmit power is less than the first available power value. For example, when the time domain resource on which the PUSCH is located, the time domain resource on which the PUCCH is located, and the time domain resource on which the first PRACH is located overlap, it is assumed that the channel priorities are the channel priority of the PUCCH>the channel priority of the PUSCH≥the channel priority of the first PRACH, and in this case, the available transmit power of the terminal device is the first available power value. When the required power of the first uplink channel is greater than or equal to the first available power value, the terminal device first sets a transmit power for the PUCCH, and if there is a power remaining after the transmit power of the PUCCH is subtracted from the first available power value, sets a transmit power for the PUSCH, or if there is no power remaining after the transmit power of the PUCCH is subtracted from the first available power value, sets a transmit power to 0 for the PUSCH or discards the PUSCH. Further, the terminal device discards the first PRACH. When the required power of the first uplink channel is less than the first available power value, the terminal device may choose to discard the first PRACH or compress the first PRACH. If the first PRACH is discarded, in current transmission, the second transmit power is 0, and the sum of the first transmit power and the second transmit power may be less than or equal to the first available power value, or if the first PRACH is compressed, the sum of the first transmit power and the second transmit power in current transmission is equal to the first available power value. Further, it should be noted that, that the first time domain resource #1 on which the PUSCH is located, the first time domain resource #2 on which the PUCCH is located, and the second time domain resource on which the first PRACH is located overlap means that the first time domain resource #1, the first time domain resource #2, and the second time domain resource partially or completely overlap in time domain, or that the first time domain resource #1, the first time domain resource #2, and the second time domain resource have a intersection in time domain.

It should be understood that according to the uplink transmission method in this embodiment of this application, under a "specific condition", the channel priority of the first uplink channel (including the PUCCH and/or the PUSCH) is higher than or equal to the channel priority of the first PRACH, and under a condition other than the "specific condition", the channel priority of the first uplink channel (including the PUCCH and/or the PUSCH) is lower than the channel priority of the first PRACH. For ease of description, the PUCCH included in the first uplink channel is briefly referred to as a PUCCH, the PUSCH included in the first uplink channel is briefly referred to as a PUSCH, and the first PRACH is briefly referred to as a PRACH below.

Optionally, the first uplink channel includes at least one of the following PUSCHs: a grant-free PUSCH transmission, a retransmitted PUSCH, a PUSCH corresponding to a first scheduling request, where the first scheduling request is used by the terminal device to request a first data transmission resource, a PUSCH corresponding to a first logical channel, a PUSCH that carries a transport block of a first transport block size, a PUSCH that carries a transport block of a first code rate, a PUSCH that carries a transport block of a first modulation scheme, and a PUSCH that carries information about a first latency requirement, where the first latency requirement is less than or equal to a first time threshold. When the first uplink channel is at least one of the foregoing PUSCHs, the channel priority of the first uplink channel is higher than or equal to the channel priority of the first PRACH.

When the PUSCH is the grant-free PUSCH transmission, the channel priority of the first uplink channel (including the PUSCH) is higher than or equal to the channel priority of the first PRACH. Specifically, a PUSCH in an existing solution is a PUSCH transmitted based on scheduling, while the grant-free PUSCH transmission is used in the standard of the 5G mobile communications technology. A resource of grant-free transmission is preconfigured by the network device, and the grant-free PUSCH transmission may be used to transmit a service that requires high reliability and a low latency, such as a URLLC service, or may be used for a service of another type. Because it is highly probable that the PUSCH is used to transmit an important service, in this embodiment of this application, it may be predefined that when the PUSCH is the grant-free PUSCH transmission, the PUSCH has a higher channel priority, and the channel priority of the grant-free PUSCH transmission is higher than or equal to the channel priority of the PRACH.

When the PUSCH is the retransmitted PUSCH, the channel priority of the PUSCH is higher than or equal to the channel priority of the PRACH. Usually, in a communications system, first transmission of data or a transport block is referred to as initial transmission, and second or later transmission of data or a transport block is referred to as retransmission, also referred to as repeated transmission (repetition) or retransmission.

This embodiment of this application is applicable to a case in which initial transmission of the PUSCH is grant-free transmission, and retransmission of the PUSCH is also grant-free transmission. Because a plurality of times of retransmissions can increase a probability of accurately transmitting information, grant-free transmission supports repeated sending to meet a high-reliability requirement of some services (for example, the URLLC service). When the PUSCH is the retransmitted PUSCH, it is highly probable that the PUSCH is used to transmit an important service, and the channel priority of the retransmitted PUSCH is higher than or equal to the channel priority of the PRACH.

This embodiment of this application is also applicable to a case in which initial transmission of the PUSCH is grant-free transmission, and retransmission of the PUSCH is scheduling-based transmission. This embodiment of this application is also applicable to a case in which initial transmission of the PUSCH is scheduling-based transmission, and retransmission of the PUSCH is grant-free transmission. This embodiment of this application is also applicable to a case in which initial transmission of the PUSCH is scheduling-based transmission, and retransmission of the PUSCH is also scheduling-based transmission. A specific form of retransmission is not limited in this embodiment of this application.

When the PUSCH is the PUSCH corresponding to the first scheduling request, the channel priority of the PUSCH is higher than or equal to the channel priority of the PRACH. The first scheduling request (Scheduling Request, SR) is used by the terminal device to request the first data transmission resource. After first determining the first scheduling request, the terminal device determines the PUSCH corresponding to the first scheduling request, where the PUSCH may be the grant-free PUSCH transmission, or may be the PUSCH transmitted based on scheduling. The first scheduling request may be a scheduling request that is predefined or is indicated in higher layer signaling. The first scheduling request may correspondingly request at least one of a time domain resource corresponding to the first data transmission resource, a frequency domain resource corresponding to the first data transmission resource, and a priority corresponding to the first data transmission resource. The first data transmission resource may be a logical channel, a transmission channel, or a physical channel.

It should be understood that the time domain resource corresponding to the first data transmission resource may have a specific length of a time domain resource, have a specific TTI length, or have specific transmission duration. In this embodiment of this application, a unit of the time domain resource may include any time length unit such as symbol, microsecond, millisecond, second, slot, or subframe. For example, the length of the time domain resource may be 1 ms, 2 ms, 3 ms, 0.125 ms, 0.5 ms, 0.375 ms, 0.25 ms, 0.0625 ms, one symbol, two symbols, three symbols, four symbols, five symbols, six symbols, seven symbols, 14 symbols, 21 symbols, or the like. The length of the time domain resource may be a maximum length of the time domain resource or a minimum length of the time domain resource. A specific representation form of the time domain resource corresponding to the first data transmission resource is not limited in this embodiment of this application.

It should be understood that the frequency domain resource corresponding to the first data transmission resource may have a specific subcarrier spacing or have a specific numerology. In this embodiment of this application, a subcarrier spacing of the frequency domain resource corresponding to the first data transmission resource may include 15 kHz, 30 kHz, 60 kHz, 120 kHz, or the like. The subcarrier spacing herein may be a maximum subcarrier spacing, or a minimum subcarrier spacing. A specific representation form of the frequency domain resource corresponding to the first data transmission resource is not limited in this embodiment of this application.

It should be understood that the first data transmission resource in this embodiment of this application may be a specific logical channel, a specific physical channel or a specific transmission channel. Definitions in related communications standards are applicable to the logical channel, the physical channel, or the transmission channel. For example, the logical channel is a channel used to provide a data transmission service at a media access control (MAC) layer. The transmission channel is a channel defined based on different transmission formats, and access of the data transmission service is implemented by using the transmission channel. The transmission channel is an interface channel between the MAC layer and a physical layer. At the physical layer, required operations such as channel coding and interleaving are performed by using the transmission channel. It should be noted that there is a mapping relationship between the transmission channel and the logical channel. After the data transmission service is generated, the data transmission service is first mapped to the logical channel, then mapped to the transmission channel from the logical channel, and then mapped to the physical channel from the transmission channel for data sending. The physical channel is a channel at the physical layer, and is a channel used to transmit data and/or control information through an air interface.

In this embodiment of this application, the terminal device sends the first scheduling request to the network device, the network device sends uplink grant information to the terminal device, where the uplink grant information is used to instruct the terminal device to send the PUSCH, and the terminal device sends the PUSCH based on the uplink grant information sent by the network device. The PUSCH is the PUSCH corresponding to the first scheduling request. It may be predefined in a system or a protocol that a specific type of scheduling request that is predefined or is configured by using higher layer signaling is a scheduling request of an important service, so that the network device determines whether the received scheduling request is the specific scheduling request, to determine whether the received scheduling request is a scheduling request of an important service. When the first scheduling request sent by the terminal device is the specific type of scheduling request, it is considered that the PUSCH corresponding to the first scheduling request is used to transmit an important service, and the channel priority of the PUSCH corresponding to the first scheduling request is higher than or equal to the channel priority of the PRACH.

When the PUSCH is the PUSCH corresponding to the first logical channel (namely, a specific logical channel), the channel priority of the PUSCH is higher than or equal to the channel priority of the PRACH. Specifically, the first logical channel may be a specific logical channel that is predefined or is configured in higher layer signaling. It may be predefined in a system or a protocol that the PUSCH corresponding to the logical channel is used to carry an important service, and the channel priority of the PUSCH corresponding to the first logical channel is higher than or equal to the channel priority of the PRACH.

When the first uplink channel (including the PUSCH) is the PUSCH that carries the transport block of the first transport block size (namely, a specific size, or a specific size range), the channel priority of the PUSCH is higher than or equal to the channel priority of the PRACH. It may be understood that the first transport block size herein may be a specific value, or may be a range, for example, greater than or less than Y bits, and Y>0, or for another example, less than or equal to Z bits, and Z>0. In other words, the first uplink channel in this embodiment of this application includes the PUSCH that carries the transport block of the first transport block size, where the first transport block size is A bits (or A bytes), and A is a positive integer, or the first uplink channel in this embodiment of this application includes the PUSCH that carries the transport block of the first transport block size, where a smallest value of the first transport block size is B bits (or B bytes), and B is a positive integer, or the first uplink channel in this embodiment of this application includes the PUSCH that carries the transport block of the first transport block size, where a largest value of the first transport block size is C bits (or C bytes), and C is a positive integer, or the first uplink channel in this embodiment of this application includes the PUSCH that carries the transport block of the first transport block size, where a range of the first transport block size is P to Q bits (or P to Q bytes), and P and Q are positive integers. In a specific example, when a transport block size of a transport block carried on the PUSCH is 256 bits (which may be alternatively another quantity X of bits, where X>0), it is considered that the PUSCH of this transport block size is used to carry an important service, and the channel priority of the PUSCH is higher than or equal to the channel priority of the PRACH.

When the PUSCH is the PUSCH that carries the transport block of the first code rate (namely, a specific code rate, or a specific code rate range), the channel priority of the PUSCH is higher than or equal to the channel priority of the PRACH. It may be understood that the first code rate herein may be a specific value, or may be a range, for example, greater than or equal to D, and D>0, or for another example, less than or equal to E, and E>0. In other words, the first uplink channel in this embodiment of this application includes the PUSCH that carries the transport block of the first code rate, where the first code rate is F, and F is a positive number, or the first uplink channel in this embodiment of this application includes the PUSCH that carries the transport block of the first code rate, where a smallest value of the first code rate is G, and G is a positive number, or the first uplink channel in this embodiment of this application includes the PUSCH that carries the transport block of the first code rate, where a largest value of the first code rate is H, and H is a positive number, or the first uplink channel in this embodiment of this application includes the PUSCH that carries the transport block of the first code rate, where a range of the first code rate is I to J, and I and J are positive numbers. In a specific example, when a code rate of a transport block carried on the PUSCH is 1/6 (which may be alternatively another code rate), it is considered that the PUSCH of this code rate is used to carry an important service, and the channel priority of the PUSCH is higher than or equal to the channel priority of the PRACH.

When the PUSCH is the PUSCH that carries the transport block of the first modulation scheme (namely, a specific modulation scheme, or a specific modulation scheme range), the channel priority of the PUSCH is higher than or equal to the channel priority of the PRACH. It may be understood that the first modulation scheme herein may be a specific modulation scheme, or may be a plurality of modulation schemes. Specifically, for example, when a modulation scheme of a transport block carried on the PUSCH is quadrature phase shift keying (QPSK) or may be another modulation scheme, for example, 16 quadrature amplitude modulation (QAM), 64QAM, or 256QAM, it is considered that the PUSCH of this modulation scheme is used to carry an important service, and the channel priority of the PUSCH is higher than or equal to the channel priority of the PRACH.

It should be understood that when a transport block carried on the PUSCH meets any one or more of the first transport block size, the first code rate, and the first modulation scheme, the channel priority of the PUSCH is higher than or equal to the channel priority of the PRACH. In a specific example, when the transport block size of the transport block carried on the PUSCH is 256 bits, the code rate is 1/6, and the modulation scheme is the QPSK, the channel priority of the PUSCH is higher than or equal to the channel priority of the PRACH.

When a latency requirement of information carried on the PUSCH is the first latency requirement, and the first latency requirement is less than or equal to the first time threshold, the channel priority of the PUSCH is higher than or equal to the channel priority of the PRACH. Specifically, the first time threshold may be predefined or may be configured by using higher layer signaling in a system or a protocol. The first latency requirement of the PUSCH is compared with the first time threshold, and if the first latency requirement is less than or equal to the first time threshold, it may be considered that the information carried on the PUSCH is information about an urgent service, and the channel priority of the PUSCH is higher than or equal to the channel priority of the PRACH, or if the first latency requirement is greater than the first time threshold, it may be considered that the information carried on the PUSCH is information about a service that is not urgent, and the channel priority of the PUSCH is lower than the channel priority of the PRACH.

Figure 9:
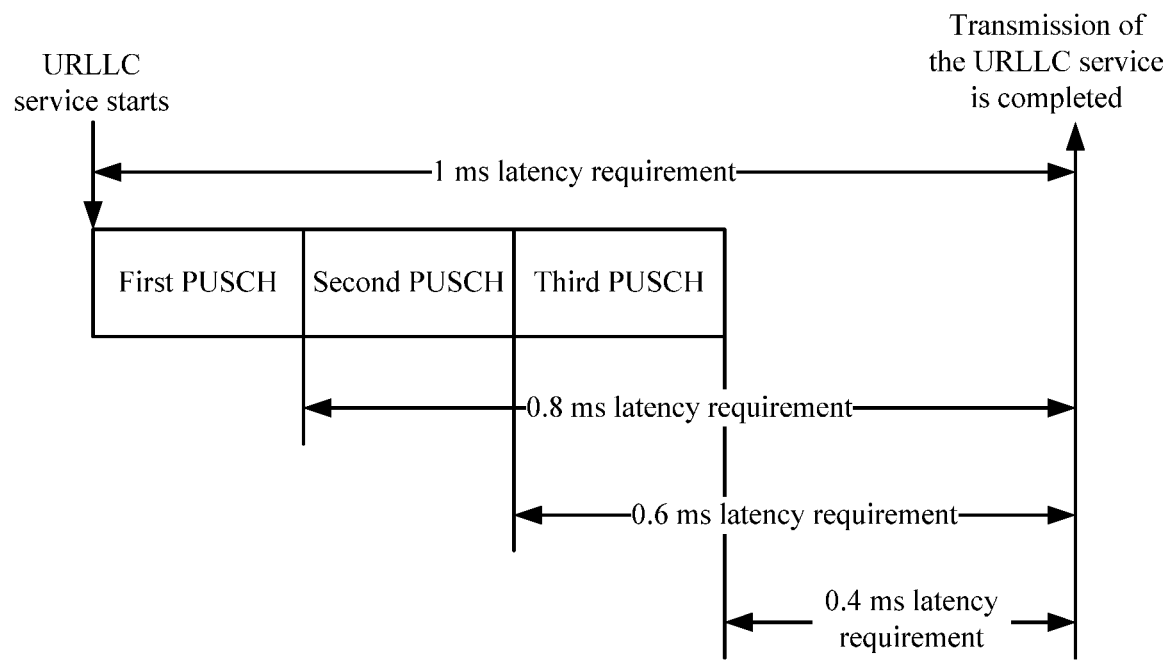
FIG. 9 is a schematic diagram of transmission of a URLLC service.

FIG. 9 is a schematic diagram of transmission of a URLLC service. For example, the URLLC service in the current 5G mobile communications technology is a service type that requires transmission accuracy to be 1 to $10^{-5}$ within 1 ms. Therefore, from the perspective of only time, a maximum time for PUSCH transmission is 1 ms. It may be learned that a shorter time remains for the URLLC service each time after a PUSCH is transmitted. For example, as shown in FIG. 9, a time for each PUSCH transmission is 0.2 ms, and assuming that the PUSCH is continuously transmitted for three times without interruption, a latency requirement remaining after transmission of a first PUSCH is 0.8 ms, a latency requirement remaining after transmission of a second PUSCH is 0.6 ms, and a latency requirement remaining after transmission of a third PUSCH is 0.4 ms. If the first time threshold is set to 0.5 ms, a channel priority of the first PUSCH and a channel priority of the second PUSCH are lower than the channel priority of the PRACH, and a channel priority of the third PUSCH is higher than or equal to the channel priority of the PRACH.

Optionally, the first uplink channel includes the PUCCH and/or the PUSCH, and the PUCCH and/or the PUSCH include/includes at least one of the following uplink control information: acknowledgement ACK information, information corresponding to a second latency requirement, where the second latency requirement is less than or equal to a second time threshold, and a second scheduling request, where the second scheduling request is used by the terminal device to request a second data transmission resource.

When the PUCCH is a PUCCH that carries predefined uplink control information (UCI), the channel priority of the PUCCH is higher than or equal to the channel priority of the PRACH. Alternatively, when the PUSCH is a PUSCH that carries predefined UCI, the channel priority of the PUSCH is higher than or equal to the channel priority of the PRACH.

Optionally, the uplink control information may be specifically the ACK, for example, the uplink control information may be specifically a HARQ (ACK) after $M^{th}$ retransmission of a PDSCH, and M is less than or equal to a preset threshold. Specifically, for example, when downlink data is being retransmitted a plurality of times by using the PDSCH, and uplink control information corresponding to a retransmission is an ACK, if the network device receives the ACK, a plurality of times of retransmissions of the PDSCH may be terminated in advance. In this way, downlink system resource consumption can be reduced and system efficiency can be improved. Therefore, it may be predefined in a system or a protocol that a PUCCH carrying the ACK is an important PUCCH, or it may be predefined in a system or a protocol that a PUSCH carrying the ACK is an important PUSCH. Further, when a quantity of times of retransmissions is relatively small, after demodulating the ACK, the network device still has time to terminate the retransmission in advance. When the quantity of times of retransmissions is relatively large or close to a maximum quantity of times of retransmissions, after demodulating the ACK, the network device has no time for processing or it is unnecessary to terminate the retransmission in advance because the retransmission has been completed. Therefore, a threshold M is introduced in the foregoing example, and M is an integer greater than or equal to zero. It should be noted that a HARQ (ACK) after $0^{th}$ retransmission of the PDSCH is a HARQ (ACK) after initial transmission of the PDSCH.

Optionally, the uplink control information may be specifically the information corresponding to the second latency requirement, and the second latency requirement is less than or equal to the second time threshold. Specifically, the second time threshold may be predefined or may be configured by using higher layer signaling in a system or a protocol. The second latency requirement that corresponds to uplink control information corresponding to information carried on a PDSCH is compared with the second time threshold, and if the second latency requirement is less than or equal to the second time threshold, it may be considered that the information carried on the PDSCH is information about an urgent service, and the channel priority of the PUCCH that carries information about the PDSCH is higher than or equal to the channel priority of the PRACH, or the channel priority of the PUSCH that carries information about the PDSCH is higher than or equal to the channel priority of the PRACH, or if the second latency requirement is greater than the second time threshold, it may be considered that the information carried on the PDSCH is information about a service that is not urgent, and the channel priority of the PUCCH that carries information about the PDSCH is lower than the channel priority of the PRACH, or the channel priority of the PUSCH that carries information about the PDSCH is higher than or equal to the channel priority of the PRACH.

Optionally, the uplink control information may be specifically the second scheduling request (namely, a specific scheduling request), and the second scheduling request is used by the terminal device to request the second data transmission resource. It may be predefined in a system or a protocol that a specific type of scheduling request that is predefined or is configured by using higher layer signaling is a scheduling request of an important service, so that the network device determines whether the received scheduling request is the specific scheduling request, to determine whether the received scheduling request is a scheduling request of an important service. When the second scheduling request sent by the terminal device by using the PUCCH is the specific type of scheduling request, it is considered that the channel priority of the PUCCH that carries the second scheduling request is higher than or equal to the channel priority of the PRACH.

Optionally, the first PRACH includes at least one of the following PRACHs: a PRACH on a serving cell of a secondary time alignment group sTAG, and a PRACH in a first format. Specifically, when the PRACH is some specific PRACHs, the channel priority of the first uplink channel (including the PUSCH and/or the PUCCH) is higher than or equal to a channel priority of the PRACH.

Optionally, when the PRACH is the PRACH on the serving cell of the secondary time alignment group (secondary Time Alignment Group, sTAG), the channel priority of the first uplink channel is higher than or equal to the channel priority of the PRACH. Due to a factor such as out-of-synchronization or the like, in some cases, the PRACH needs to be sent in the sTAG, and the PUSCH or the PUCCH needs to be sent in a primary time alignment group (pTAG) or on another TAG. In an existing power setting solution, the channel priority of the PRACH is higher, and therefore, a transmit power of the PUSCH and/or a transmit power of the PUCCH may be insufficient. In the 5G mobile communications technology, it is more probable that the PUSCH and/or the PUCCH carry/carries more important information. Transmission of important information may fail if the power setting solution of the 4G mobile communications technology is still followed. Therefore, in this embodiment of this application, it may be specified in a standard protocol or a system that transmission of the PRACH on the serving cell of the secondary time alignment group sTAG is delayed, and the channel priority of the first uplink channel is higher than or equal to the channel priority of the PRACH.

Optionally, when the PRACH is the PRACH in the first format, the channel priority of the first uplink channel is higher than or equal to the channel priority of the PRACH. Specifically, the format of the PRACH includes a format 1, a format 2, a format 3, and a format 4. It may be predefined in a system that a PRACH in a specific first format (for example, format 1) in the foregoing formats is not urgent. When a format of the PRACH is the first format, the channel priority of the first uplink channel is higher than or equal to the channel priority of the PRACH.

Optionally, when the length of the second time domain resource is a second time length, and/or a subcarrier spacing of a frequency domain resource on which the first PRACH is located is a second subcarrier spacing, the channel priority of the first uplink channel is higher than or equal to the channel priority of the PRACH. Specifically, the following may be predefined or may be configured by using higher layer signaling in a protocol or a system. When the length of the second time domain resource corresponding to the PRACH is a specific time length (for example, the second time length), or has a specific TTI, and/or the second frequency domain resource corresponding to the PRACH has a specific numerology, that is, has a specific subcarrier spacing (for example, the second subcarrier spacing), the channel priority of the first uplink channel is higher than or equal to the channel priority of the PRACH.

It should be understood that in this embodiment, the second time length may be a value or a range. For example, the second time length may be specifically two symbols, or may be less than or equal to seven symbols, or may be greater than or equal to S symbols and less than or equal to T symbols, where S and T are positive integers greater than or equal to 1. It should be noted that the time length herein may be a symbol, a slot, a mini-slot, a subframe, or a frame. The second subcarrier spacing may be a value or a range. For example, the second subcarrier spacing may be specifically 60 kHz, or may be greater than or equal to 60 kHz, or may be greater than or equal to 30 kHz and less than or equal to 120 kHz.

Optionally, the uplink transmission method further includes receiving, by the terminal device, first information, where the first information is used to instruct the terminal device to send the first PRACH. When the first information is configured in higher layer signaling or carried on a physical channel, the channel priority of the first uplink channel is higher than or equal to the channel priority of the PRACH.

In this embodiment of this application, the first information may be configured by using RRC signaling or MAC signaling, that is, the PRACH is a PRACH triggered by an RRC parameter or a MAC parameter. The first information may be alternatively carried on a PDCCH, that is, the first information is indication (PDCCH order) information carried on the PDCCH, and the PRACH is a PRACH triggered by the PDCCH order. In the foregoing two cases, the PRACH is a PRACH triggered by the network device. A time interval from a time of triggering the PUSCH and/or the PUCCH by the network device to a time of sending the PUSCH and/or the PUCCH is generally less than or equal to a time interval from a time of triggering the PRACH by the network device to a time of sending the PRACH. Therefore, if the network device first triggers the PRACH, and then triggers the PUSCH and/or the PUCCH, it may be assumed that the network device considers by default that the PUSCH and/or the PUCCH are/is more urgent and require higher channel priorities. On the contrary, if the PRACH is triggered after triggering of the PUSCH and/or the PUCCH, it should be considered that the channel priority of the PRACH is higher. The terminal device may determine the channel priority of the first uplink channel and the channel priority of the PRACH based on a trigger time. The terminal device may alternatively determine the channel priority of the first uplink channel and the channel priority of the PRACH based on whether the PRACH is a PRACH triggered by the network device.

Correspondingly, the network device sends the first information, where the first information is used to instruct the terminal device to send the first PRACH, the first information is configured in the higher layer signaling or carried on the physical channel, the second time domain resource on which the first PRACH is located and the first time domain resource on which the first uplink channel is located overlap, the first uplink channel includes at least one of the physical uplink shared channel PUSCH and the physical uplink control channel PUCCH, and the channel priority of the first uplink channel is higher than or equal to the channel priority of the first PRACH, and the network device detects the first PRACH on the second time domain resource.

It should be understood that the first uplink channel in this case is a first uplink channel to be sent by the terminal device. The first uplink channel may be indicated by the network device, or may be sent by the terminal device itself. Specific content of the first uplink channel herein has been described above, and details are not described herein again.

It should be understood that although the network device instructs the terminal device to send the first PRACH, because the channel priority of the first uplink channel is higher than or equal to the channel priority of the first PRACH, the terminal device may send the first PRACH at a very small power, or the terminal device may give up sending the first PRACH. The network device detects the first PRACH, but may not obtain the first PRACH through detection.

It should be further understood that because the terminal device further sends the first uplink channel, the network device may further detect the first uplink channel.

Optionally, the channel priority of the first uplink channel is higher than or equal to the channel priority of the PRACH when the uplink transmission method further includes following cases. The terminal device receives second information on a third time domain resource, where the second information is used to instruct the terminal device to send the first uplink channel on the first time domain resource, and the channel priority of the first uplink channel is higher than or equal to the channel priority of the first PRACH, or the terminal device receives second information on a third time domain resource, where the second information is used to instruct the terminal device to send the first uplink channel on the first time domain resource, and a time interval from a start moment of the third time domain resource to a start moment of the first time domain resource is less than or equal to a third time threshold.

Optionally, the terminal device may receive the second information that is used to instruct the terminal device to send the first uplink channel (including the PUSCH and/or the PUCCH) on the first time domain resource. When the second information carries a bit status indication (for example, this bit status is used to support the priority of the first uplink channel, for example, when the bit status is 0, the terminal device may learn that the channel priority of the first uplink channel is higher than or equal to the channel priority of the first PRACH, and when the bit status is 1, the terminal device may learn that the channel priority of the first uplink channel is lower than the channel priority of the first PRACH), the terminal device may learn that the channel priority of the first uplink channel is higher than or equal to the channel priority of the first PRACH. Alternatively, the terminal device may learn, by using a format of the second information (for example, the format of the second information is a specific format, namely, a downlink control information (DCI) format, for example, when the DCI format is a format 1, the terminal device may learn that the channel priority of the first uplink channel is higher than or equal to the channel priority of the first PRACH, and when the DCI format is another format, the terminal device may learn that the channel priority of the first uplink channel is lower than the channel priority of the first PRACH), that the channel priority of the first uplink channel is higher than or equal to the channel priority of the first PRACH. Alternatively, when the second information is a specific scrambled radio network temporary identifier (RNTI), the terminal device may learn that the channel priority of the first uplink channel is higher than or equal to the channel priority of the first PRACH. For example, when the RNTI is a first RNTI, the terminal device may learn that the channel priority of the first uplink channel is higher than or equal to the channel priority of the first PRACH, and when the RNTI is another RNTI, the terminal device may learn that the channel priority of the first uplink channel is lower than the channel priority of the first PRACH.

It should be understood that the network device may indicate, based on importance of information carried on a currently scheduled PUSCH and/or PUCCH, whether the channel priority of the PUSCH and/or the channel priority of the PUCCH are/is higher than the channel priority of the PRACH, to ensure that a channel priority of a PUSCH and/or a channel priority of a PUCCH used to transmit an important service are/is higher, and a channel priority of a PUSCH and/or a channel priority of a PUCCH used to an unimportant service are/is lower. It is assumed that the network device knows importance of information carried on each PUSCH and/or PUCCH.

Optionally, the second information may be uplink grant information and/or downlink grant information carried on a corresponding physical downlink control channel (PDCCH).

Optionally, the terminal device receives the second information on the third time domain resource, where the time interval from the start moment of the third time domain resource to the start moment of the first time domain resource is less than or equal to the third time threshold, and the second information is used to instruct the terminal device to send the first uplink channel on the first time domain resource. The third time threshold may be predefined or may be configured by using higher layer signaling in a system or a protocol. The terminal device compares the time interval from the start moment of the third time domain resource to the start moment of the first time domain resource with the third time threshold, and if the time interval is less than or equal to the third time threshold, it may be considered that information carried on the first uplink channel is information about an urgent service. Therefore, the channel priority of the first uplink channel is higher than the channel priority of the PRACH.

In an existing LTE frequency division duplex (FDD) system, a time interval from a time of sending scheduling information (namely, the second information) to a time of sending the PUSCH and/or the PUCCH is four subframes. In the 5G mobile communications system, a value of the time interval is indicated by using the scheduling information, that is, the value may be any integer quantity of symbols greater than or equal to 0. For example, when the time interval from a time of sending the scheduling information to a time of sending the PUSCH and/or the PUCCH is eight symbols, and the third time threshold is 14 symbols, the channel priority of the PUSCH and/or the channel priority of the PUCCH are/is higher than or equal to the channel priority of the PRACH, when the time interval from a time of sending the scheduling information to a time of sending the PUSCH and/or PUCCH is 28 symbols, and the third time threshold is 14 symbols, the channel priority of the PUSCH and/or the channel priority of the PUCCH are/is lower than the channel priority of the PRACH.

Correspondingly, the network device sends the second information on the third time domain resource, where the second information is used to instruct the terminal device to send the first uplink channel on the first time domain resource, and the channel priority of the first uplink channel is higher than or equal to the channel priority of the first PRACH, or the network device sends the second information on the third time domain resource, where the second information is used to instruct the terminal device to send the first uplink channel on the first time domain resource, and the time interval from the start moment of the third time domain resource to the start moment of the first time domain resource is less than or equal to the third time threshold, where the first uplink channel includes at least one of the physical uplink shared channel PUSCH and the physical uplink control channel PUCCH, the first time domain resource and the second time domain resource on which the first PRACH is located overlap, and the channel priority of the first uplink channel is higher than or equal to the channel priority of the first PRACH, and the network device detects the first uplink channel on the first time domain resource.

It should be understood that the first PRACH in this case is a first PRACH to be sent by the terminal device. The first PRACH may be indicated by the network device, or may be sent by the terminal device itself. Specific content of the first PRACH herein has been described above, and details are not described herein again.

It should be understood that although the terminal device plans to send the first PRACH, because the channel priority of the first uplink channel is higher than or equal to the channel priority of the first PRACH, the terminal device may send the first PRACH at a very small power, or the terminal device may give up sending the first PRACH.

The network device may further detect the first PRACH in addition to the first uplink channel, but may not obtain the first PRACH through detection.

Optionally, a length of the first time domain resource of the first uplink channel is a first time length, and/or a subcarrier spacing of a frequency domain resource on which the first uplink channel is located is a first subcarrier spacing.

Specifically, the following may be predefined or may be configured by using higher layer signaling or may be notified by using a physical channel in a system. When the length of the first time domain resource corresponding to the PUSCH and/or the PUCCH is a specific time length (for example, the first time length), or has a specific TTI, and/or the first frequency domain resource corresponding to the PUSCH and/or the PUCCH has a specific numerology, that is, has a specific subcarrier spacing (for example, the first subcarrier spacing), the channel priority of the first uplink channel is higher than or equal to the channel priority of the PRACH.

In this embodiment of this application, it may be predefined in a system or a protocol that the PUSCH and/or the PUCCH that are/is sent on a specific time-frequency domain resource are used to carry an important service, to ensure that an important PUSCH and/or an important PUCCH have/has higher channel priorities. For example, a PUSCH and/or a PUCCH transmitted on a two-symbol time domain resource have/has higher channel priorities. For another example, a PUSCH and/or a PUCCH transmitted on a 60 kHz frequency domain resource have/has higher channel priorities. For still another example, a PUSCH and/or a PUCCH transmitted on a two-symbol time domain resource and a 60 kHz frequency domain resource have/has higher channel priorities. It should be understood that in this embodiment of this application, a maximum time length of the first time domain resource may be set to the first time length, or a minimum time length of the first time domain resource may be set to the first time length, and a minimum subcarrier spacing of the first frequency domain resource may be set to the first subcarrier spacing, and a maximum subcarrier spacing of the first frequency domain resource may be set to the first subcarrier spacing.

It should be understood that in this embodiment, the first time length may be a value or a range. For example, the first time length may be specifically one symbol, or may be less than or equal to 14 symbols, or may be greater than or equal to E symbols and less than or equal to F symbols, and E and F are positive integers greater than or equal to 1. It should be noted that the time length herein may be a symbol, a slot, a mini-slot, a subframe, or a frame. The first subcarrier spacing may be a value or a range. For example, the first subcarrier spacing may be specifically 60 kHz, or may be greater than or equal to 30 kHz, or may be greater than or equal to 30 kHz and less than or equal to 120 kHz.

Optionally, the first uplink channel may be a first uplink channel retransmitted for a $K^{th}$ time, where K is an integer greater than or equal to 1.

Specifically, the following may be predefined or may be configured by using higher layer signaling or may be notified by using a physical channel in a system or a protocol. When the PUSCH and/or the PUCCH are/is a predefined PUSCH and/or PUCCH, for example, the PUSCH and/or the PUCCH are/is a PUSCH and/or a PUCCH retransmitted for a $K^{th}$ time, the channel priority of the first uplink channel is higher than or equal to the channel priority of the PRACH. K is an integer greater than or equal to 1, and K may be a preset threshold.

As mentioned above, sending of the PUSCH and/or the PUCCH may support a plurality of times of retransmissions. A value of K may be predefined or may be configured by using higher layer signaling or may be configured by using a physical channel in a system or a protocol. When a current quantity of times of retransmissions of the PUSCH and/or the PUCCH is greater than or equal to K, it is considered that the PUSCH and/or the PUCCH have/has been retransmitted for a plurality of times, and that a service carried on the PUSCH and/or the PUCCH is very important and needs to be correctly transmitted, and the channel priority of the first uplink channel is higher than or equal to the channel priority of the PRACH. When a current quantity of times of retransmissions of the PUSCH and/or the PUCCH is less than K, it is considered that transmission of the PUSCH and/or the PUCCH may just start, and that there still is an opportunity to retransmit the PUSCH and/or the PUCCH, and the channel priority of the first uplink channel is lower than the channel priority of the PRACH.

It should be understood that the first scheduling request, the first data transmission resource, the first logical channel, the first transport block size, the first code rate, the first modulation scheme, the first latency requirement, the first time threshold, the second latency requirement, the second time threshold, the second scheduling request, the second data transmission resource, the first format, the third time threshold, the first time length, the first subcarrier spacing, the second time length, the second subcarrier spacing, K, and the like in this specification may be configured by using higher layer signaling, or may be predefined, or may be notified by using a physical channel. This is not limited in the embodiments of this application.

It should be further understood that when the first uplink channel includes any one or more of the first uplink channels (including the PUSCH and/or the PUCCH) described in the embodiments of this application, or the first PRACH includes any one or more of the PRACHs described in the embodiments of this application, or the first uplink channel includes any one or more of the first uplink channels described in the embodiments of this application and the first PRACH includes any one or more of the PRACHs described in the embodiments of this application, the channel priority of the first uplink channel is higher than or equal to the channel priority of the first PRACH.

The foregoing describes the uplink transmission method provided in the embodiments of this application, and the following describes a terminal device and a network device that are provided in the embodiments of this application.

Figure 10:
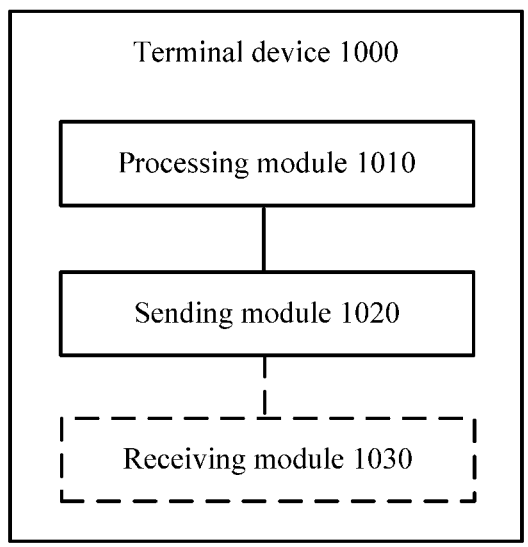
FIG. 10 is a schematic block diagram of a terminal device according to an embodiment of this application.

FIG. 10 is a schematic block diagram of a terminal device 1000 according to an embodiment of this application. As shown in FIG. 10, the terminal device 1000 includes a processing module 1010, configured to set a first transmit power for a first uplink channel based on a channel priority of the first uplink channel and a channel priority of a first physical random access channel PRACH, where the first uplink channel includes at least one of a physical uplink shared channel PUSCH and a physical uplink control channel PUCCH, a first time domain resource on which the first uplink channel is located and a second time domain resource on which the first PRACH is located overlap, the channel priority of the first uplink channel is higher than or equal to the channel priority of the first PRACH, and the first transmit power is greater than 0, and a sending module 1020, configured to send the first uplink channel at the first transmit power obtained by the processing module 1010.

When a time domain resource of the PUSCH and/or a time domain resource of the PUCCH overlap/overlaps the time domain resource of the first PRACH, a channel priority of the PUSCH and/or a channel priority of the PUCCH are/is set to be higher than or equal to the channel priority of the first PRACH, and the terminal device in this embodiment of this application sets the first transmit power for the PUSCH and/or the PUCCH based on the channel priority, so that compared with an existing solution, the transmit power can be more preferentially set for the PUSCH and/or the PUCCH, and power setting is more proper and more suitable for the PUSCH and/or the PUCCH, thereby improving service transmission quality.

Optionally, in an embodiment, the first uplink channel includes at least one of the following PUSCHs: a grant-free PUSCH transmission, a retransmitted PUSCH, a PUSCH corresponding to a first scheduling request, where the first scheduling request is used by the terminal device to request a first data transmission resource, a PUSCH corresponding to a first logical channel, a PUSCH that carries a transport block of a first transport block size, a PUSCH that carries a transport block of a first code rate, a PUSCH that carries a transport block of a first modulation scheme, and a PUSCH that carries information about a first latency requirement, where the first latency requirement is less than or equal to a first time threshold.

Optionally, in an embodiment, the first uplink channel includes the PUCCH and/or the PUSCH, and the PUCCH and/or the PUSCH include/includes at least one of the following uplink control information: acknowledgement ACK information, information corresponding to a second latency requirement, where the second latency requirement is less than or equal to a second time threshold, and a second scheduling request, where the second scheduling request is used by the terminal device to request a second data transmission resource.

Optionally, in an embodiment, the first PRACH includes at least one of the following PRACHs: a PRACH on a serving cell of a secondary time alignment group sTAG, and a PRACH in a first format.

Optionally, in an embodiment, the terminal device further includes a receiving module 1030, configured to receive first information, where the first information is used to instruct the terminal device to send the first PRACH, and the first information is configured in higher layer signaling or carried on a physical channel.

Optionally, in an embodiment, the terminal device further includes a receiving module 1030, configured to receive second information on a third time domain resource, where the second information is used to instruct the terminal device to send the first uplink channel on the first time domain resource, and the channel priority of the first uplink channel is higher than or equal to the channel priority of the first PRACH, or configured to receive second information on a third time domain resource, where the second information is used to instruct the terminal device to send the first uplink channel on the first time domain resource, and a time interval from a start moment of the third time domain resource to a start moment of the first time domain resource is less than or equal to a third time threshold.

Optionally, in an embodiment, a length of the first time domain resource is a first time length, and/or a subcarrier spacing of a frequency domain resource on which the first uplink channel is located is a first subcarrier spacing, and/or a length of the second time domain resource is a second time length, and/or a subcarrier spacing of a frequency domain resource on which the first PRACH is located is a second subcarrier spacing, and/or the first uplink channel is a first uplink channel retransmitted for a $K^{th}$ time, where K is an integer greater than or equal to 1.

Optionally, in an embodiment, the processing module 1010 is further configured to set a second transmit power for the first PRACH based on the channel priority of the first uplink channel and the channel priority of the first PRACH, where a sum of the first transmit power and the second transmit power is less than or equal to a maximum allowed transmit power of the terminal device, and the second transmit power is greater than 0, and the sending module 1020 is further configured to send the first PRACH at the second transmit power obtained by the processing module.

Optionally, in an embodiment, the second transmit power is less than a required power of the first PRACH.

Optionally, in an embodiment, a sum of a required power of the first uplink channel and the required power of the first PRACH is greater than a first available power value, the first available power value is less than or equal to the maximum allowed transmit power, and the sum of the first transmit power and the second transmit power is less than or equal to the first available power value.

Figure 11:
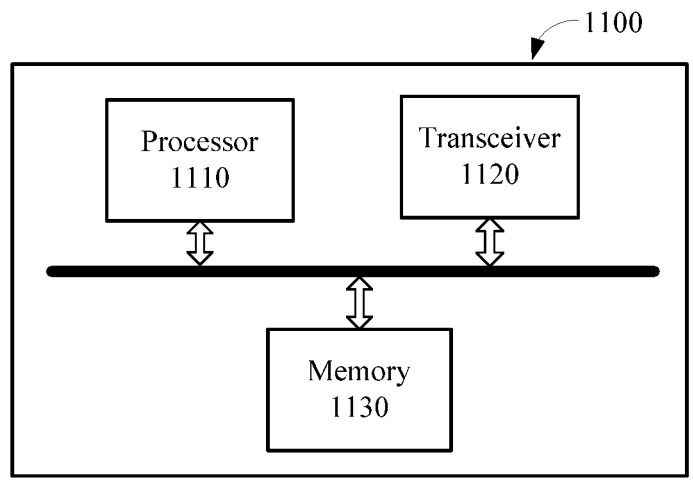
FIG. 11 is a schematic block diagram of a terminal device according to another embodiment of this application.

It should be noted that in this embodiment of this application, the processing module 1010 may be implemented by a processor, and the sending module 1020 and the receiving module 1030 may be implemented by a transceiver. As shown in FIG. 11, a terminal device 1100 may include a processor 1110, a transceiver 1120, and a memory 1130. The memory 1130 is configured to store code, to control the processor 1110 and the transceiver 1120 to execute corresponding functions.

In other words, the terminal device 1100 may include the processor 1110, the transceiver 1120, and the memory 1130. The memory 1130 is configured to store an instruction, and the processor 1110 and the transceiver 1120 are configured to execute the instruction stored in the memory 1130. The processor 1110 is configured to set a first transmit power for a first uplink channel based on a channel priority of the first uplink channel and a channel priority of a first physical random access channel PRACH, where the first uplink channel includes at least one of a physical uplink shared channel PUSCH and a physical uplink control channel PUCCH, a first time domain resource on which the first uplink channel is located and a second time domain resource on which the first PRACH is located overlap, the channel priority of the first uplink channel is higher than or equal to the channel priority of the first PRACH, and the first transmit power is greater than 0, and the transceiver 1120 is configured to send the first uplink channel at the first transmit power obtained by the processor 1110.

Components of the terminal device 1100 may communicate with each other through an internal connection channel, to transfer control and/or data signals.

The terminal device 1100 shown in FIG. 11 or the terminal device 1000 shown in FIG. 10 can implement various processes in the foregoing method embodiment. To avoid repetition, details are not described herein again.

Figure 12:
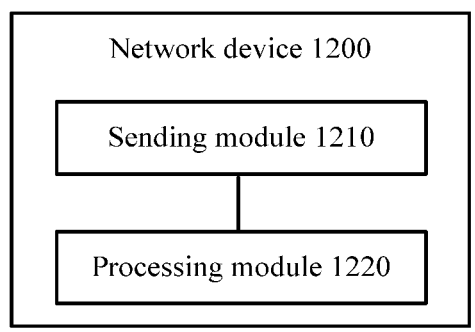
FIG. 12 is a schematic block diagram of a network device according to an embodiment of this application.

FIG. 12 is a schematic block diagram of a network device 1200 according to an embodiment of this application. As shown in FIG. 12, the network device 1000 includes a sending module 1210, configured to send first information, where the first information is used to instruct a terminal device to send a first PRACH, where the first information is configured in higher layer signaling or carried on a physical channel, a second time domain resource on which the first PRACH is located and a first time domain resource on which a first uplink channel is located overlap, the first uplink channel includes at least one of a physical uplink shared channel PUSCH and a physical uplink control channel PUCCH, and a channel priority of the first uplink channel is higher than or equal to a channel priority of the first PRACH, and a processing module 1220, configured to detect the first PRACH on the second time domain resource.

The network device in this embodiment of this application instructs the terminal device to send the first PRACH, and when a time domain resource of the PUSCH and/or a time domain resource of the PUCCH overlap/overlaps the time domain resource of the first PRACH, sets a channel priority of the PUSCH and/or a channel priority of the PUCCH to be higher than or equal to the channel priority of the first PRACH, so that compared with an existing solution, the terminal device can more preferentially set a transmit power for the PUSCH and/or the PUCCH, and power setting is more proper and more suitable for the PUSCH and/or the PUCCH, thereby improving service transmission quality.

Figure 13:
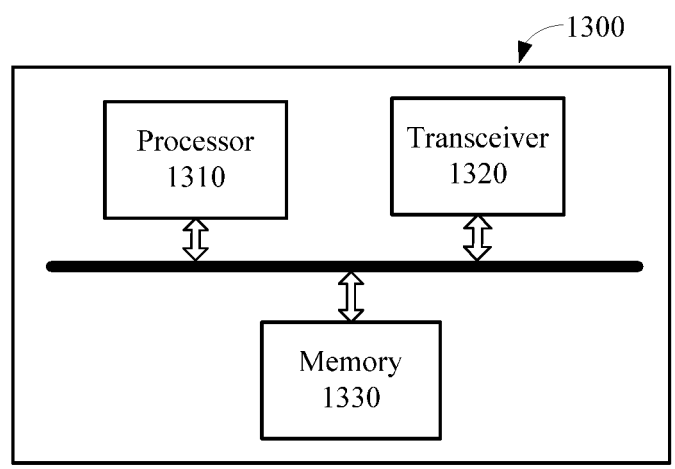
FIG. 13 is a schematic block diagram of a network device according to another embodiment of this application.

It should be noted that in this embodiment of this application, the processing module 1220 may be implemented by a processor, and the sending module 1210 may be implemented by a transceiver. As shown in FIG. 13, a network device 1300 may include a processor 1310, a transceiver 1320, and a memory 1330. The memory 1330 is configured to store code, to control the processor 1310 and the transceiver 1320 to execute corresponding functions.

In other words, the network device 1300 may include the processor 1310, the transceiver 1320, and the memory 1330. The memory 1330 is configured to store an instruction, and the processor 1310 and the transceiver 1320 are configured to execute the instruction stored in the memory 1330. The transceiver 1320 is configured to send first information, where the first information is used to instruct a terminal device to send a first PRACH, where the first information is configured in higher layer signaling or carried on a physical channel, a second time domain resource on which the first PRACH is located and a first time domain resource on which a first uplink channel is located overlap, the first uplink channel includes at least one of a physical uplink shared channel PUSCH and a physical uplink control channel PUCCH, and a channel priority of the first uplink channel is higher than or equal to a channel priority of the first PRACH, and the processor 1310 is configured to detect the first PRACH on the second time domain resource.

Components of the network device 1300 may communicate with each other through an internal connection channel, to transfer control and/or data signals.

The network device 1300 shown in FIG. 13 or the network device 1200 shown in FIG. 12 can implement various processes in the foregoing method embodiment. To avoid repetition, details are not described herein again.

An embodiment of this application further provides a network device. The network device has a structure similar to that of the network device 1200 shown in FIG. 12, and includes a sending module, configured to send second information on a third time domain resource, where the second information is used to instruct a terminal device to send a first uplink channel on a first time domain resource, and a channel priority of the first uplink channel is higher than or equal to a channel priority of a first PRACH, or configured to send second information on a third time domain resource, where the second information is used to instruct a terminal device to send a first uplink channel on a first time domain resource, and a time interval from a start moment of the third time domain resource to a start moment of the first time domain resource is less than or equal to a third time threshold, where the first uplink channel includes at least one of a physical uplink shared channel PUSCH and a physical uplink control channel PUCCH, the first time domain resource and a second time domain resource on which the first PRACH is located overlap, and the channel priority of the first uplink channel is higher than or equal to the channel priority of the first PRACH, and a processing module, configured to detect the first uplink channel on the first time domain resource.

The network device in this embodiment of this application instructs the terminal device to send the first uplink channel, and when a time domain resource of the PUSCH and/or a time domain resource of the PUCCH overlap/overlaps the time domain resource of the first PRACH, the first uplink channel is explicitly or implicitly indicated as an important channel, and/or when a time interval from a time of sending the second information used to schedule the first uplink channel to a time of sending the first uplink channel is less than a specific threshold, the first uplink channel is implicitly indicated as of relatively high importance and the channel priority of the first uplink channel is higher than or equal to the channel priority of the first PRACH, so that compared with an existing solution, the terminal device can more preferentially set a transmit power for the PUSCH and/or the PUCCH, and power setting is more proper and more suitable for the PUSCH and/or the PUCCH, thereby improving service transmission quality.

Similarly, the structure of the network device may be alternatively similar to that of the network device 1300 shown in FIG. 13, and includes a processor, a transceiver, and a memory. The memory is configured to store code, to control the processor and the transceiver to execute corresponding functions. The transceiver is configured to send second information on a third time domain resource, where the second information is used to instruct a terminal device to send a first uplink channel on a first time domain resource, and a channel priority of the first uplink channel is higher than or equal to a channel priority of a first PRACH, or configured to send second information on a third time domain resource, where the second information is used to instruct a terminal device to send a first uplink channel on a first time domain resource, and a time interval from a start moment of the third time domain resource to a start moment of the first time domain resource is less than or equal to a third time threshold, where the first uplink channel includes at least one of a physical uplink shared channel PUSCH and a physical uplink control channel PUCCH, the first time domain resource and a second time domain resource on which the first PRACH is located overlap, and the channel priority of the first uplink channel is higher than or equal to the channel priority of the first PRACH. The processor is configured to detect the first uplink channel on the first time domain resource.

The network device can implement various processes in the foregoing method embodiment. To avoid repetition, details are not described herein again.

It should be understood that the processor mentioned in the embodiments of this application may be a central processing unit (CPU), or may be another general purpose processor, a digital signal processor (DSP), an application-specific integrated circuit (ASIC), a field programmable gate array (FPGA) or another programmable logical device, a discrete gate or a transistor logical device, a discrete hardware component, or the like. The general purpose processor may be a microprocessor, or the processor may be any conventional processor or the like.

It should be further understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example rather than limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general purpose processor, a DSP, an ASIC, an FPGA or another programmable logical device, a discrete gate or a transistor logic device, or a discrete hardware component, the memory (a storage module) is integrated into the processor.

It should be noted that the memory described in this specification includes but is not limited to these and any memory of another proper type.

An embodiment of this application further provides a computer readable storage medium, where the computer readable storage medium stores an instruction, and when the instruction is run on a computer, the computer is enabled to perform the method performed by a terminal device in the foregoing method embodiment.

An embodiment of this application further provides a computer readable storage medium, where the computer readable storage medium stores an instruction, and when the instruction is run on a computer, the computer is enabled to perform the method performed by a network device in the foregoing method embodiment.

An embodiment of this application further provides a computer program product including an instruction, where when the instruction of the computer program product is run on a computer, the computer performs the method performed by a terminal device in the foregoing method embodiment.

An embodiment of this application further provides a computer program product including an instruction, where when the instruction of the computer program product is run on a computer, the computer performs the method performed by a network device in the foregoing method embodiment.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instruction is loaded and executed on a computer, the procedures or functions of the embodiments of this application are completely or partially generated. The computer may be a general purpose computer, a special-purpose computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible by a computer, or a data storage device, such as a server or a data center, integrating one or more available media. The usable medium may be a magnetic medium (for example, a floppy disk, a hard disk, or a magnetic tape), an optical medium (for example, a high-density digital video disc (DVD), a semiconductor medium (for example, a solid state disk (SSD)), or the like.

It should be understood that the first, second, and various numerical numbers in this specification are differentiated merely for ease of description and are not intended to limit the scope of this application.

It should be understood that the term "and/or" in this specification is only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not constitute any limitation on the implementation processes of the embodiments of this application.

A person of ordinary skill in the art may be aware that units and algorithm steps in the examples described with reference to the embodiments disclosed in this specification may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be another division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   setting, by a terminal device, a first transmit power for a first uplink channel according to a channel priority of the first uplink channel, a channel priority of a first physical random access channel (PRACH) and a channel priority of a second PRACH, wherein the first uplink channel comprises at least one of a physical uplink shared channel (PUSCH) or a physical uplink control channel (PUCCH), wherein a first time domain resource on which the first uplink channel is located, a second time domain resource on which the first PRACH is located, and a third time domain resource on which the second PRACH is located overlap, wherein the channel priority of the second PRACH is higher than the channel priority of the first uplink channel, wherein the channel priority of the first uplink channel is higher than to the channel priority of the first PRACH, and wherein the first transmit power is greater than 0; and sending, by the terminal device, the first uplink channel at the first transmit power.

2. The method according to claim 1, wherein the first PRACH comprises at least one of:
a PRACH on a serving cell of a secondary time alignment group (sTAG); or
a PRACH in a first format.

3. The method according to claim 1, further comprising:
performing at least one of discarding, by the terminal device, the first PRACH, or setting a second transmit power to 0 for the first PRACH.

4. The method according to claim 1, further comprising:
setting, by the terminal device, a second transmit power for the first PRACH according to the channel priority of the first uplink channel and the channel priority of the first PRACH, wherein a sum of the first transmit power and the second transmit power is less than or equal to a maximum allowed transmit power of the terminal device, and wherein the second transmit power is greater than 0; and
sending, by the terminal device, the first PRACH at the second transmit power.

5. The method according to claim 4, wherein the second transmit power is less than a required power of the first PRACH.

6. The method according to claim 4, wherein a sum of a required power of the first uplink channel and a required power of the first PRACH is greater than a first available power value, wherein the first available power value is less than or equal to the maximum allowed transmit power, and wherein the sum of the first transmit power and the second transmit power is less than or equal to the first available power value.

7. The method according to claim 6, wherein the first available power value is an available transmit power of the terminal device minus a required power of the second PRACH.

8. The method according to claim 1, wherein the first uplink channel comprises at least one of:
a grant-free PUSCH transmission;
a retransmitted PUSCH;
a PUSCH corresponding to a first scheduling request, wherein the first scheduling request is used by the terminal device to request a first data transmission resource;
a PUSCH corresponding to a first logical channel;
a PUSCH that carries a transport block of a first transport block size;
a PUSCH that carries a transport block of a first code rate;
a PUSCH that carries a transport block of a first modulation scheme; or
a PUSCH that carries information about a first latency requirement, wherein the first latency requirement is less than or equal to a first time threshold.

9. The method according to claim 1, wherein the at least one of the PUSCH or the PUCCH comprises uplink control information that is at least one of:
acknowledgement (ACK) information;
information corresponding to a second latency requirement, wherein the second latency requirement is less than or equal to a second time threshold; or
a second scheduling request, wherein the second scheduling request is used by the terminal device to request a second data transmission resource.

10. A terminal device, comprising:
a transceiver;
at least one processor; and
a non-transitory computer readable medium storing a program for execution by the processor for operation of the terminal device in a single cell or with carrier aggregation, the program including instructions to:
set a first transmit power for a first uplink channel according to a channel priority of the first uplink channel, a channel priority of a first physical random access channel (PRACH) and a channel priority of a second PRACH, wherein the first uplink channel comprises at least one of a physical uplink shared channel (PUSCH) or a physical uplink control channel (PUCCH), wherein a first time domain resource on which the first uplink channel is located, a second time domain resource on which the first PRACH is located, and a third time domain resource on which the second PRACH is located overlap, wherein the channel priority of the second PRACH is higher than the channel priority of the first uplink channel, wherein the channel priority of the first uplink channel is higher than the channel priority of the first PRACH, and wherein the first transmit power is greater than 0; and
cause the transceiver to send the first uplink channel at the first transmit power.

11. The terminal device according to claim 10, wherein the first PRACH comprises at least one of:
a PRACH on a serving cell of a secondary time alignment group (sTAG); or
a PRACH in a first format.

12. The terminal device according to claim 10, wherein the program further includes instructions to:
perform at least one of discard the first PRACH, or set a second transmit power to 0 for the first PRACH.

13. The terminal device according to claim 10, wherein the program further includes instructions to set a second transmit power for the first PRACH based on the channel priority of the first uplink channel and the channel priority of the first PRACH, wherein a sum of the first transmit power and the second transmit power is less than or equal to a maximum allowed transmit power of the terminal device, and the second transmit power is greater than 0; and
cause the transceiver to send the first PRACH at the second transmit power.

14. The terminal device according to claim 13, wherein a sum of a required power of the first uplink channel and a required power of the first PRACH is greater than a first available power value, wherein the first available power value is less than or equal to the maximum allowed transmit power, and wherein the sum of the first transmit power and the second transmit power is less than or equal to the first available power value.

15. The terminal device according to claim 14, wherein the first available power value is an available transmit power of the terminal device minus a required power of the second PRACH.

16. The terminal device according to claim 10, wherein the first uplink channel comprises at least one:
a grant-free PUSCH transmission;
a retransmitted PUSCH;
a PUSCH corresponding to a first scheduling request, wherein the first scheduling request is used by the terminal device to request a first data transmission resource;
a PUSCH corresponding to a first logical channel;
a PUSCH that carries a transport block of a first transport block size;
a PUSCH that carries a transport block of a first code rate;

a PUSCH that carries a transport block of a first modulation scheme; or a PUSCH that carries information about a first latency requirement, wherein the first latency requirement is less than or equal to a first time threshold.

17. The terminal device according to claim 10, wherein the at least one of PUSCH or the PUCCH comprises uplink control information that is at least one of:

acknowledgement (ACK) information;

information corresponding to a second latency requirement, wherein the second latency requirement is less than or equal to a second time threshold; or a second scheduling request, wherein the second scheduling request is used by the terminal device to request a second data transmission resource.

18. A non-transitory computer readable storage medium having instructions stored thereon, which when executed by at least one processor of a terminal device, causes the at least one processor to perform one or more operations comprising:

setting a first transmit power for a first uplink channel based on a channel priority of the first uplink channel, a channel priority of a first physical random access channel (PRACH) and a channel priority of a second PRACH, wherein the first uplink channel comprises at least one of a physical uplink shared channel (PUSCH) or a physical uplink control channel (PUCCH), wherein a first time domain resource on which the first uplink channel is located, a second time domain resource on which the first PRACH is located and a third time domain resource on which the second PRACH is located overlap, wherein the channel priority of the second PRACH is higher than the channel priority of the first uplink channel, wherein the channel priority of the first uplink channel is higher than the channel priority of the first PRACH, and wherein the first transmit power is greater than 0; and sending the first uplink channel at the first transmit power.

\* \* \* \* \*